United States Patent
Balinsky et al.

(10) Patent No.: US 8,656,181 B2
(45) Date of Patent: Feb. 18, 2014

(54) METHOD AND SYSTEM FOR BUSINESS WORKFLOW CYCLE OF A COMPOSITE DOCUMENT

(75) Inventors: Helen Balinsky, Wales (GB); Steven J. Simske, Fort Collins, CO (US)

(73) Assignee: Hewlett-Packard Development Company, L.P., Houston, TX (US)

( * ) Notice: Subject to any disclaimer, the term of this patent is extended or adjusted under 35 U.S.C. 154(b) by 190 days.

(21) Appl. No.: 13/116,376

(22) Filed: May 26, 2011

(65) Prior Publication Data

US 2012/0303968 A1 Nov. 29, 2012

(51) Int. Cl.
*G06F 12/14* (2006.01)

(52) U.S. Cl.
USPC .............. 713/189; 713/165; 726/26; 707/705

(58) Field of Classification Search
USPC .................... 713/165, 189; 726/26; 707/705; 380/285
See application file for complete search history.

(56) References Cited

U.S. PATENT DOCUMENTS

| | | | |
|---|---|---|---|
| 6,067,551 A | 5/2000 | Brown et al. | |
| 7,386,797 B1 | 6/2008 | Chatterjee et al. | |
| 7,778,859 B2* | 8/2010 | Bouzas et al. ............... | 705/7.11 |
| 2003/0033167 A1 | 2/2003 | Arroyo et al. | |
| 2004/0078373 A1 | 4/2004 | Ghoneimy et al. | |
| 2004/0083433 A1 | 4/2004 | Takeya | |
| 2004/0117737 A1 | 6/2004 | Bera | |
| 2004/0135805 A1 | 7/2004 | Gottsacker et al. | |
| 2005/0027733 A1 | 2/2005 | Donahue | |
| 2005/0120199 A1* | 6/2005 | Carter ........................ | 713/150 |
| 2006/0047977 A1 | 3/2006 | Hanasaki | |
| 2006/0230075 A1* | 10/2006 | Greef et al. .................. | 707/200 |
| 2007/0186157 A1 | 8/2007 | Walker et al. | |

(Continued)

FOREIGN PATENT DOCUMENTS

| | | |
|---|---|---|
| JP | 2007066200 | 3/2007 |
| WO | PCT/US10/49638 | 9/2010 |
| WO | PCT/US10/49669 | 9/2010 |

OTHER PUBLICATIONS

Ignat et al. "Operation-based versus State-based Merging in Asynchronous Graphical Collaborative Editing", Nov. 2004, pp. 1-8.*

(Continued)

*Primary Examiner* — Shewaye Gelagay

(57) ABSTRACT

A method and system for a business workflow of a composite document are described. An integrity and authenticity of an entry table are identified and verified using a verification key, a map file corresponding to entries in the table are identified using a private user decryption key, signature verification keys and access keys are read from the map file, and authenticity of the map file and the document parts are verified. Following verification, content is delivered to a user for review, update and/or modification of the content, and then is encrypted, signed, and moved along the workflow, normally to the next workflow participant. A secure distribution version of a composite document is created from a master copy by creating a serialization including at least one part of a composite document and at least one user, creating a table listing document parts and associated users, generating encryption and decryption keys, encrypting document parts, applying signatures to encrypted document parts, updating the tables with the signed parts and updating the composite document with the updated tables. A master copy is updated from a secure distribution copy after the distribution copy has completed a workflow and a workflow wrap.

17 Claims, 13 Drawing Sheets

(56) References Cited

U.S. PATENT DOCUMENTS

| | | | |
|---|---|---|---|
| 2007/0288835 A1 | 12/2007 | Watanabe | |
| 2008/0028300 A1 | 1/2008 | Krieger et al. | |
| 2008/0082929 A1* | 4/2008 | Stignani et al. | 715/764 |
| 2009/0150761 A1 | 6/2009 | Sawicki et al. | |
| 2009/0172043 A1 | 7/2009 | Dullanty | |
| 2009/0288150 A1 | 11/2009 | Toomim et al. | |
| 2009/0313331 A1 | 12/2009 | Rasmussen et al. | |
| 2010/0046749 A1* | 2/2010 | Hatano et al. | 380/44 |
| 2010/0174783 A1 | 7/2010 | Zarom | |

OTHER PUBLICATIONS

U.S. Appl. No. 12/949,510, filed Nov. 18, 2010, Balinsky et al.

Balinsky, Helen, et al., "Publicly Posted Composite Documents," (Power Point Slides) ACM DocEng 2010, Manchester UK, Sep. 21-24, 2010.

Balinsky, Helen Y., et al., "Differential Access for Publicly-Posted Composite Documents with Multiple Workflow Participants," (Article) ACM DocEng '10, Manchester, UK, Sep. 21-24, 2010.

Adobe Systems Incorporated, "A Primer on Electronic Document Security," Technical Whitepaper, pp. 1-14, 2007.

Dridi, Fredj, et al., "Towards Access Control for Logical Document Structures," Proceedings of the Ninth International Workshop on Database and Expert Systems Applications, DEXA 98, pp. 322-327, Vienna, Austria, Aug. 1998.

Chou, Seng-Cho T., "Managin Multi-party Documents in a Network Computing Environment," Software-Practice and Experience, vol. 28(12), pp. 1315-1325, Oct. 1998.

Brainloop AG Product Data Sheet, "Brainloop Outlook Add-In + Sent-To," http://www.brainloop.com/products/resources.html, Sep. 4, 2009 (Support for Sep. 4, 2009 date at References P and Q).

Website print-out as support for Sep. 4, 2009 date of Reference O (available as of Jan. 12, 2011 at http://www.brainloop.com/de/products/search.html).

Web browser screen shot as additional Support for Sep. 4, 2009 date of Reference O (screen shot image available as of Jan. 12, 2011 at http://www.brainloop.com/de/products/search.html).

Brainloop AG Product Data Sheet, "Brainloop Secure Dataroom Service 8.0," http://www.brainloop.com/products/resources.html, Aug. 3, 2010 (Support for Aug. 3, 2010 date at References S and T).

Website print-out as support for Aug. 3, 2010 date of Reference R (available as of Jan. 12, 2011 at http://www.brainloop.com/de/products/search.html).

Web browser screen shot as additional support for the Aug. 3, 2010 date of Reference R (screen shot image available as of Jan. 12, 2011 at http://www.brainloop.com/de/products/search.html).

Brainloop AG (Michael Rasmussen), White Paper, "Managing Information Risk in the Extended Enterprise: Why Corporate Compliance & IT Security Must Join Forces," www.brainloop.com, Nov. 1, 2010 (Support for Nov. 1, 2010 date at Reference V.

Brainloop Press Release, "Brainloop Publishes New White Paper on Managing Document Security," to support Nov. 1, 2010 date for Document U (available as of Jan. 7, 2011 at www.brainloop.com/news-events/press-releases/press-releases/backpid/99/article/brainloop-publishes-new-white-paper-onmanaging-document-securitybr-managing-information-risk-in.html?type=98).

Ignat, Claudia-Lavinia, et al., "Operation-based Versus State-based Merging in Asynchronous Graphical Collaborative Editing," Sixth International Workshop on Collaborative Editing Systems, CSCW'04, IEE Distributed Systems online, available at http://www.loria.fr/~ignatcia/pmwiki/pub/papers/IgnatCEW04.pdf, Nov. 2004 (support for Nov. 2004 date at Reference AD).

Publication data obtained from website, http://www.loria.fr, as support for Nov. 2004 date for Reference AC.

* cited by examiner

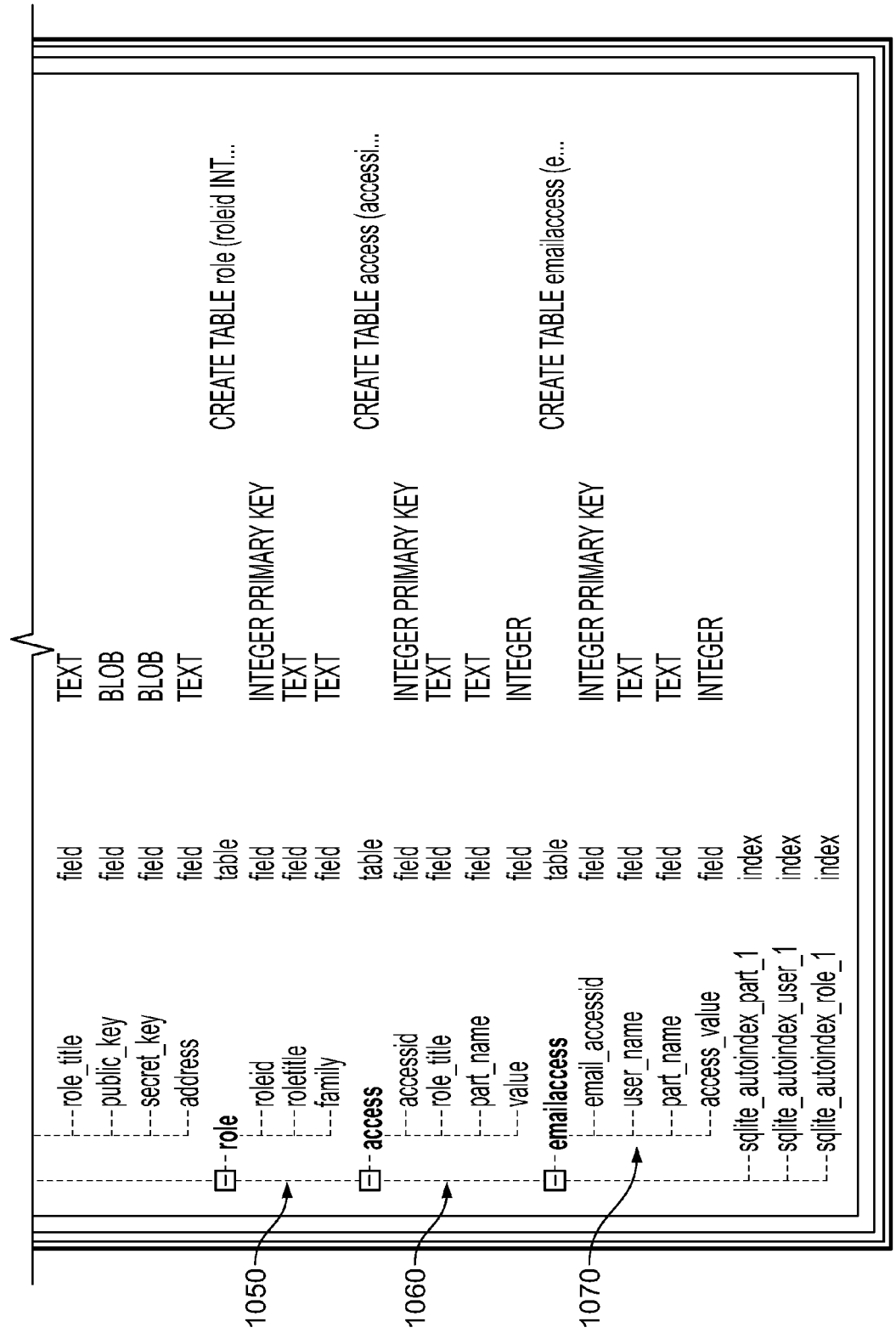

METHOD AND SYSTEM FOR BUSINESS WORKFLOW CYCLE OF A COMPOSITE DOCUMENT

BACKGROUND

Computer documents may be accessed by multiple computer users in multiple locations, and security may be an important concern for businesses and other organizations, particularly where documents are created through collaborative processes like multi-party, multi-organization document workflows.

In such collaborative processes, which can vary in nature widely (from contract reviews, to research grant proposal submissions, to shareholder presentations, etc.) multiple users (e.g. in many different locations) may contribute material to a document or revise the document's content. In a large organization, collaborating users may be located all over the world. Collaborative processes can also take place between organizations. In such settings, users from several different organizations may access the same document.

Users may contribute to a workflow cycle of the document by reviewing, editing, etc., the document or parts of it. As the document circulates among users during a workflow cycle, it may be subjected to security risks inherent within computing systems present at a user's location. Some users also may not be granted full access to all parts, or components, of a document, so there may be a need for security among elements of a document.

Different environments may be available during stages of a workflow cycle of a document. A secure environment would be desirable for creation of the document, setting security features and creating copies for circulation among less secure environments. Workflow cycles would need to address creation of such circulation copies and their subsequent re-introduction back into a secure environment.

Issues of security may be more complex when the document accessed (in a collaborative process or other process) is comprised of parts such as a separately-editable text and images.

Figure 1:
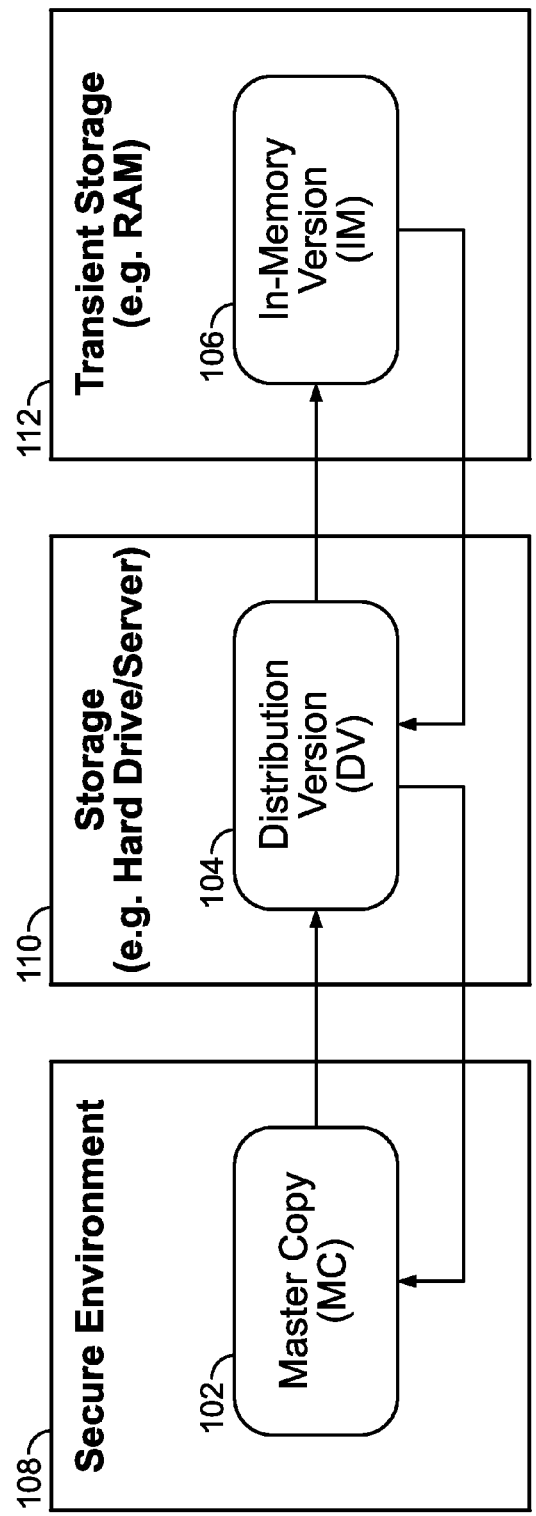
FIG. 1 is an illustration showing elements of a document security system, according to an embodiment of the invention.

Where considered appropriate, reference numerals may be repeated among the drawings to indicate corresponding or analogous elements. Moreover, some of the blocks depicted in the drawings may be combined into a single function.

DETAILED DESCRIPTION

In the following detailed description, numerous specific details are set forth in order to provide a thorough understanding of different embodiments of the invention. However, it will be understood by those of ordinary skill in the art that embodiments of the present invention may be practiced without these specific details. In other instances, well-known methods, procedures, components, and circuits have not been described in detail so as not to obscure the present invention.

An embodiment of the present invention may provide a system and method for a business workflow cycle of a composite document within and among multi-user environments, where, for example, users may access a document from multiple locations that may not be secure. A workflow of a document may begin by using a master copy (MC) of a document to create a version suitable for distribution. A distribution version (DV) may be circulated among users according to a workflow and may be edited, reviewed, etc. by each user during each workflow stage. According to a workflow, a DV may be recombined with an MC after a DV has completed a workflow cycle. A distribution version may be created and recombined in a secure environment.

The life of a secure composite document may start from a MC, which may be created in a secure environment. A strongly secured DV may be generated, e.g. automatically, from a corresponding MC according to a desired workflow. A DV may be created with a high degree of security relative to an environment it may propagate along or through during an assigned workflow. A DV may ensure that only authorized workflow participants may access distinct parts of a document, and may be in accordance with granted access provisions and/or permissions. A DV may propagate along a workflow, may accumulate updates, approvals, deliver information, etc., may perform business functionality, and may be re-imported back into a secure environment, e.g. the original secure environment, and may be performed in accordance with its workflow requirement. A DV may be verified inside a secured environment and may be merged back into a MC, following input from a final workflow participant, completing a workflow lifecycle. It then may be archived. In some embodiments, workflow may terminate at an intermediate step, and such termination may be pre-determined or may be propagation-determined.

A DV may be modified and/or altered at each step along a workflow, or a workflow distribution. A workflow may be a linear process, and downstream access may also be modified and/or restricted, where such restrictions may facilitate secure access by participants according to individual access rights. A DV created from a MC may have predetermined access allocations, and such allocations may be modified during a workflow, in accordance with parameters of a workflow. A workflow process order may be predefined, and may be according to decisions relating to information contained within documents of a workflow.

A document workflow (or "workflow") may be a sequence of accesses by a person or a group of persons, or one or more automatic services that for example either contribute to the content of a document (or a process related to the document) or allow person(s) to familiarize themselves with some part of the document's contents. Contributions to the document or a process related to the document can vary from, for example, active editing of the document's content to filling in blanks or completing information requests in the document (e.g. as a form), to simply registering an incoming document (e.g. at a location).

Document workflows may not be contained within a single secure and trusted environment (such as within a single company or other organization). Document workflows may be ad hoc or planned, regular or non-standard, occasional or frequent, inter- or intra-organization, etc., and may often carry high sensitivity data distributed over potentially non-secure communication channels such as by e-mail or on disk, placed in a public cloud (e.g. for public, Internet-based computing). Document workflows may further involve virtual organizations, with different document participants located in different locations, where access rights, or more importantly, security measures may be different, and documents may be comprised of parts with heterogeneous access sensitivities.

A document workflow may or may not be contained within an organization and it may be impossible and/or impractical to provide access for workflow participants to an internal system where a MC (master copy) may be created. A version that may have security features, e.g. a secured DV (distribution version), of a document may be generated from a corresponding MC (master copy), within a secure environment, and may provide protection during distribution in open, e.g. low security, environments. A DV may be a version of an MC that may be designed to be distributed over traditional low-security communication channels while delivering all data to workflow participants according to a granted access, where such granted access may be predetermined.

A DV may be delivered to users, e.g. over non-secure communication channels, may be accessed on shared devices and may be stored in memory that may not be secure, e.g. on a hard drive of a computer of a user, on an unsecured network server, on a network memory, on a random access memory (RAM) drive, etc. Other security measures may be used, such as for example only allowing a part of a document to be viewed at a time if security may be compromised by viewing a document as a whole. A DV in such an example may be capable of withstanding hazards (attacks) characteristic of an unprotected environment, e.g. where unauthorized modification may be immediately detected by the following workflow participant. A DV may be a specially constructed document with a pre-defined structure, and may further ensure that only authorized users, e.g. authorized workflow participants, may access the document or its constituent parts according to a user's granted access rights. Such differential access may be maintained, for example, through a set of key-map files (user-specific access keys) and an entry-table (a table for locating the key-map file(s) for a particular user while maintaining user anonymity), included in the DV.

An MC (which may originate a DV) may be a composite document and the DV created from such an MC may be a composite document, e.g. a document referred to as a Publically-Posted Composite Document (PPCD) generated from systems developed by the Hewlett-Packard Company of Palo Alto, Calif., where the DV may include an embedded mechanism for access control.

As used herein a "composite document" may be a document having a set of individually accessible, e.g. separately addressable, content parts. In an embodiment, content parts may include components (files), sub-components (file fragments) and/or component/subcomponent (file/file fragment) groups, e.g. called "tessellations," which may be encrypted together and maintained in the DV as a single content part. A composite document may be described in pending U.S. patent application Ser. No. 13/006,147, "DOCUMENT SECURITY SYSTEM AND METHOD", filed Jan. 13, 2011 hereby incorporated by reference in its entirety.

Components and sub-components may be considered "atomic units" within a composite document, as they may be smallest units of individually accessible, e.g. addressable, content in a document. File types for components and sub-components may vary widely, and a composite document may include components and/or sub-components having the same file format or file formats that may be different from each other. Atomic units may also be assigned different policies for different users, e.g. different workflow participants. For example, one user may be given "read/write" (RW) access for a content part and be asked, e.g. as part of a workflow, to modify the content part, while another user may be granted "read only" (RO) access to the same part and may be able only to familiarize him- or herself with the part contents. A third user may be granted "no access" (NA) to the same content part and this user may not have read or write access, e.g. or be able to view at all, the content part.

Components and sub-components that may require the same security access may also be aggregated or grouped, in an embodiment, into super-component-groups, e.g. "tessellations", and may reduce the number of content parts in a composite document. Combinations of components and/or subcomponents may also be grouped into tessellations, e.g. according to an access policy. Atomic unit groups, e.g. groups of components and/or subcomponents, may be aggregated for security (encryption) and may be reassembled when decrypted. As each user (or workflow participant) may attempt to access a DV (or a copy of a DV), a transient in-memory version (IM) of a DV may be created by an application accessing a DV. A document interface, for example, may be provided as part of an application program, and may generate an IM from a DV according to a particular user's access rights. An IM (in-memory version) may provide decrypted, e.g. "clear-text", versions of those parts of the document that may be accessible to a user, e.g. components, sub-components tessellations, etc. A user may provide input to a document, e.g. adding, deleting or editing content, through the graphical user interface (GUI) and/or application interacting with an IM, where, for example, an application may have exclusive access to the memory containing an IM.

A user may make changes to a document and/or may make changes to decrypted parts available in an IM, and upon completion a document interface, e.g. accessed by an application program, may update a DV. A clear text content part may be encrypted by a corresponding encryption key and then may be signed by a corresponding signature key, and operations of encrypting and signing may be done in transient memory. Signing may be performed using a particularly assigned content part signature key and may be recovered (with encryption keys) from a key-map entry in a DV. An encrypted and/or signed content part may be reintroduced into a DV.

A DV may originate from an MC and a DV may have a lifecycle traveling from user to user, or where each user accesses one copy of the DV in turn. A workflow may define a lifecycle of a document and/or user access to a document. Changes and/or updates may be made to a DV or to an IM of a user, and may update a DV in an encrypted form. When all users have completed accessing a document, a DV may be re-imported back into an original secure environment, according to a workflow. A DV may be merged with an MC, to create an updated MC, within a secure environment, e.g. the same secure environment where a DV was created from an MC. Multiple copies of a DV may also be created, where, for example, each workflow participant may receive his or her own copy of a DV to access content, e.g. read, edit, etc., according to his or her access privileges.

An embodiment of the invention may provide that each user, e.g. each workflow participant, may receive exclusive access to unencrypted data when he or she may run an application, e.g. using a document interface, to view DV material through an IM.

An embodiment of the invention may further provide that clear-text data, e.g. unencrypted forms of content from a DV, may be removed from a computer or computing device after either a normal application exit or an accidental or malicious crash. Safe handling of data may be ensured, for example, where all decrypted ("clear text") data and access keys from key-map entry may be stored only in transient memory and/or a running application may have exclusive access to content data in an IM. For relatively small documents, or when a user may be accessing a DV using a computer having a large amount of available processor or other transient memory, e.g. a large amount of random-access memory (RAM), it may be possible to keep all of decrypted content parts available to a user in transient memory, e.g. for a particular user access. For larger documents, less than all content parts may be presented simultaneously, e.g. using available transient memory, e.g. RAM. Different strategies may be employed to present decrypted content to a user, while maintaining safe-handling of the data, such that decrypted, "clear-text" data may not be left behind on a computer or computing device after either a normal application exit or an accidental or malicious crash.

Many different structures may be used for composite document serialization (in the MC, DV and IM forms) including a structure with a relational database format. Serialization may be a process of converting a data structure or object into a bit sequence or format so that the data structure or object may be stored in a file. A document serialization may be the data structure or object used that leads to a storage file. A relational database format may provide a document serialization structure and a coherent way to handle relational data, needed for access, such as content and permissions, e.g. in key-map entries. A relational database format implemented through a database system library such as the SQLite™ library (available from the SQLite Development Team (www.sqlite.org)), may allow in-memory relational database access for retrieving permission and content information, for example.

One type of composite document format may be the *.pex composite format (from Hewlett-Packard Company of Palo Alto, Calif.). A *.pex document may be aggregated as needed per a workflow. A .pex document may include one or more of typical document pieces, such as *.jpeg, *.pdf, *.doc, *.html, etc. files. With a *.pex document format, further component groups such as tessellations are also possible. A *.pex composite structure, for example, may include content-parts, each individually encrypted and signed and key-map files, e.g. one per each workflow participant per session. Alternatively, key-map files (or the user entries found in the key-map files) may, for example, be rolled into a workflow wrap or accompanied by the entry-table. In an embodiment, a key-map file may grant document access to a workflow participant, but when there is a need to enforce a particular order of access, a key-map file for workflow participant K may be made unavailable until participant K−1 accesses. Such ordered access may be made through a workflow wrap. A workflow wrap may be described in pending U.S. patent application Ser. No. 12/949,510, "MANAGING ACCESS TO A SECURE DIGITAL DOCUMENT", filed Nov. 18, 2010 hereby incorporated by reference in its entirety.

Document Lifecycle

Reference is made to FIG. 1, which illustrates a document security system, according to an embodiment of the invention. FIG. 1 depicts Master Copy (MC) 102, Distribution Version (DV) 104 and In-Memory Version (IM) 106.

MC 102 may be a version of a document, such as a composite document maintained in secure environment 108 away from general user access. Secured environment 108 may be a computer-environment where the required access control may be enforced by an operating system (OS) or by a secure domain controller within the intranet of an organization and/or enterprise, that may prevent access to an MC by users, e.g. workflow participants, who may not be employees of the organization. In such an example, users, or workflow participants, may have limited, or no access to MC 102. Access may be controlled for example by a system administrator or an electronic workflow system.

DV 104 may originate from MC 102. When one or more users, e.g. outside of an enterprise and/or organization, may wish (or may be required by a workflow) to access a document represented by MC 102, DV 104 may be generated from MC 102. For example, DV 104 may be automatically generated from MC 102 for a particular workflow.

DV (distribution version) 104 may be created, for example, for a purpose of being passed between different users, e.g. workflow participants. DV 104 may be crafted to embed an access control structure into its format. DV 104 may be created, for example, using a *.pex composite document structure format. DV 104 may be expected to transport between workflow participants by low security communication channels, e.g., sent by e-mail, posted on optical or electronic media (CD/DVD/USB), uploaded/downloaded from widely accessible servers, shared drives, etc.

DV (distribution version) 104 may be created according to a workflow, or a workflow cycle. A workflow may specify aspects of DV 104, for example, a designation of users and associated access rights, where such access may be provided to parts of DV 104, and such rights may include read only or read and write access, or no access. A workflow cycle may also describe an order of distribution of DV 104 to users.

A user (workflow participant) may receive a copy of DV 104, and DV 104 may be loaded onto storage 110, e.g. such as on a computer hard drive on a server or other computer, which may be unsecured or which may have only limited security. In such an example, DV 104 may provide secure delivery of document contents to distributed workflow participants who may be using unsecured storage and delivery systems.

A user (workflow participant) may have requested access to a document, e.g. MC 102, and an electronic workflow system may have generated DV 104. In an embodiment a user may receive his or her own copy of DV 104. For example, a user may receive DV 104 on a disk, or through email. A user may download DV 104 from a web site or Cloud (Cloud computing architecture and/or system), or other remote system, onto storage 110, which may be a hard drive on a personal computer. In another example, an electronic workflow system may make DV 104 available on a network server through a file system that may have limited security protection. A DV may be received where a user, e.g. User N, may be a workflow participant and he or she may receive DV 104 from a previous workflow participant, e.g. User N−1. User N may be expected to contribute to a document according to his or her role in a document workflow and corresponding access granted. User N may then send the document to another workflow participant, e.g. User N+1, by an available (non-secure) communication channel. DV 104 may be distributed among users in accordance with a workflow cycle. A workflow cycle may be embedded within DV 104, and may be determined when DV 104 may be created from MC 102, or predetermined.

DV 104 may ensure that only authorized users, e.g. authorized workflow participants, may access document content according to associated granted access rights. Where a document may be a composite document that may include a number of different content parts, e.g. components, sub-components, tessellations, other logical division, etc., DV 104 may ensure that a user may access only those parts within DV 104 that may correspond to a user's granted access rights. A workflow may include specifications for access to parts of a composite document.

Users (workflow participants) may not be in the same organization, and may be spatially separated, and there may be no shared security space where an entity such as a trusted security manager may provide and/or control access for every, or some, workflow participant. Accordingly, DV 104 may be generated with embedded access control so each user may only access his or her parts (the DV 104, itself, providing a mechanism to control user access).

A user (workflow participant) may employ a local agent, e.g. a software application, to access DV 104. A document interface, e.g. working as part of or in conjunction with the application program, may generate IM 106. A user may not be able to directly access DV 104, but a document interface may enable a user to access IM 106, e.g. through management and/or application of the user's private decryption keys. IM 106 may provide unencrypted versions (clear-text copies) of content from DV 104 that a user may be permitted to access.

IM 106 may be created and exist only on transient storage 112, which may be processor memory such as a processor's random-access memory (RAM). Other types of transient memory such as, for example, caches, e.g. client-transparent data caches, and/or hardware buffers may serve as transient storage 112. IM 106 may exist only while a user is operating an application, e.g. to edit or alter the document, and may be removed upon completion of editing and/or alteration.

An application program, e.g. using a document interface, may have exclusive access to transient storage 112 as it runs. When an application may be terminated, e.g. by a user-initiated exit or by an accidental or malicious quit, IM 106 may be erased from transient storage 112 and IM 106 may be lost, and no copy may be available. Potential data losses may be minimized by an application that may be running, e.g. as a usability feature, may periodically and/or automatically store an encrypted backup of latest typed-in, or entered, information or update a DV (using a DV update procedure such as described herein). As each application owns its allocated memory an attempt by an application to access another application's memory may cause, for example, a "memory violation", prevented by an operating system (OS). With an IM, a user may run an individual application to access a DV and no other user on the same system may access an associated IM version.

A user (workflow participant) may provide input to a document, e.g. adding, deleting and/or editing content, through IM 106. When a user may make changes to a document, a user may make changes to IM 106. Upon a user's completion of an editing session, (or, for example, upon a user's input of a "save" command), an application may, e.g. using the document interface, "check in" or move changes and/or editing back into DV 104, creating an updated version of DV 104 (which may remain encrypted). At an end of a user's session, an application may close and IM 106 may be erased, e.g. by a document interface, from transient storage 112.

Figure 2:
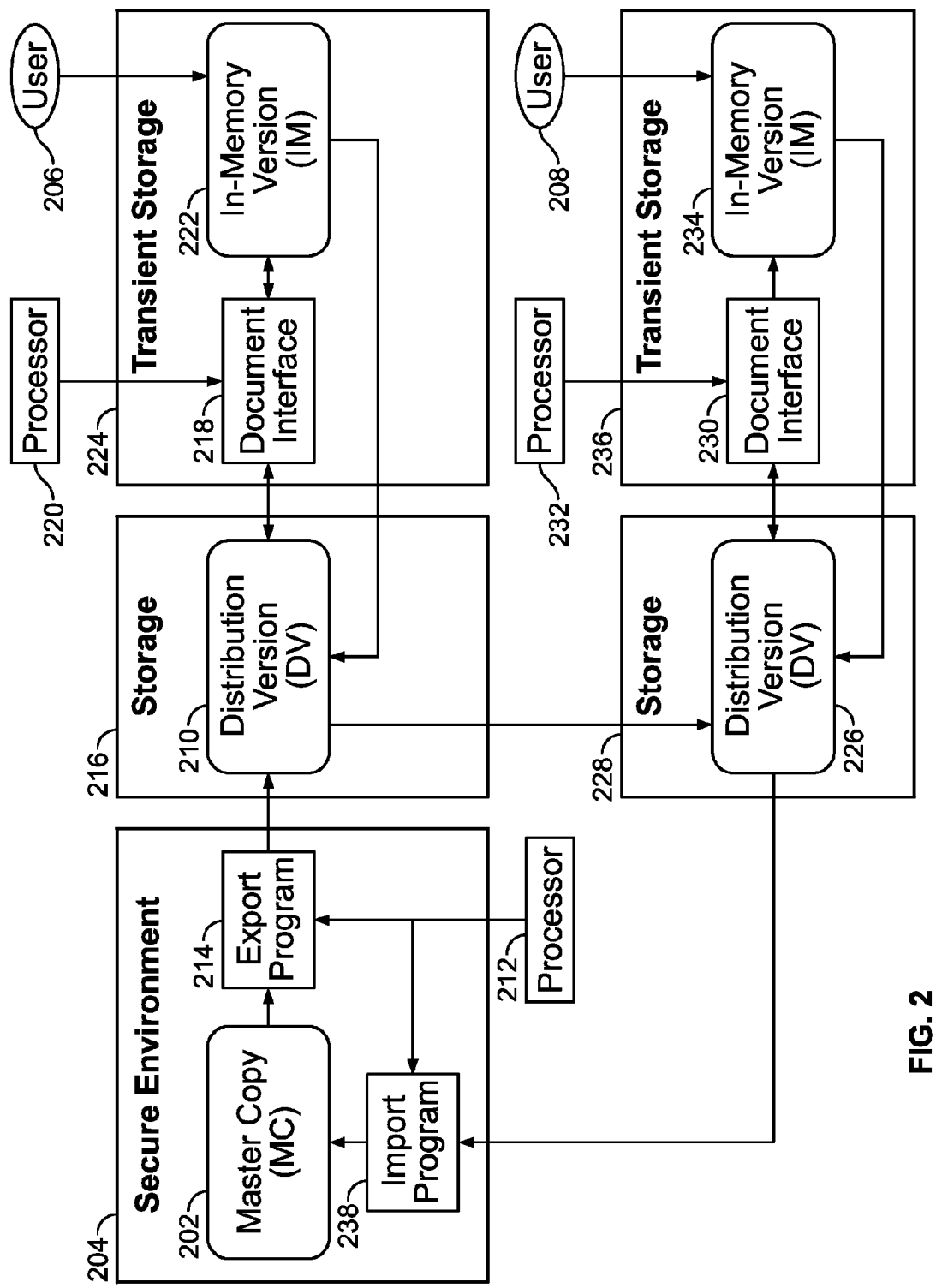
FIG. 2 is an illustration showing a document lifecycle within a document security system, according to an embodiment of the present invention.

Other users (workflow participants) who may wish to edit a document may also be given access to (or a copy of) DV 104. Reference is now made to FIG. 2, which is an illustration showing a document lifecycle within a document security system, according to an embodiment of the present invention.

Master copy (MC) 202 may be a document, such as a composite document, maintained in secure environment 204. Users 206 and 208 may be participants in a workflow. Users 206 and 208 may have no access or limited access to MC 202. As an alternate to allowing users 206, 208 to access MC 202, an embodiment may provide distribution version (DV) 210. DV 210 may originate from MC 202. When one or more of users 206, 208 may wish to access a document, e.g. MC 202, for example to execute tasks in a workflow, DV 210 may be generated from MC 202. DV 210 may be generated from MC 202 according to a workflow cycle, and may be sent to users 206, 208.

DV 210 may be a version of MC 202 designed to be distributed over traditional low-security communication channels. DV 210 may be crafted to embed an access control structure into its format. For example, DV 210 may be a .pex format document, in which all content parts may be individually encrypted and signed. DV 210 may propagate to different users, e.g. to users along a path of a workflow, to accumulate editing, updating and/or review that may be input from users. For example, user 206, in attempting to access a document, e.g. MC 202, may be provided with DV 210, generated, for example, by processor 212, running export program 214.

DV 210 may be loaded on storage 216, e.g. on a computer hard drive on a server or other computer or computing device, which may be unsecured or which may have limited security. For example, export program 214 may generate DV 210 and make it available on a network server through a file system that may have limited security protection. In another example, user 206 may receive a copy of DV 210, e.g. on a disk, through email, etc. User 206 may download DV 210 onto storage 216, which may be a hard drive on a personal computer.

DV 210 may ensure that only authorized users, e.g. authorized workflow participants, may access a document according to associated granted access rights. Where a document may be a composite document that may include different content parts, e.g. components, sub-components, tessellations, etc., DV 210 may ensure that user 206 may access components within DV 210 that may correspond to associated granted access rights.

User 206 may attempt to access DV 210 through an application program which may operate using document interface 218, e.g. operated by processor 220. Document interface 218 may generate IM 222. IM 222 may include unencrypted versions (clear-text copies) of content from DV 210 that user 206 may be permitted to access. IM 222 may be created to assist a user with performing assigned tasks according to a workflow or workflow cycle.

IM 222 may be created and exist in transient storage 224, e.g. a running copy of an application program and document interface 218 may also exist in transient storage 224. Transient storage 224 may be a processor memory, e.g. a random-access memory (RAM) of a computer of user 206, and/or caches, buffers, etc. as may be described above. In some embodiments, for example in a low security environment, for a non-sensitive document, etc., document parts that may be in an IM 222 may be stored on a fixed medium, e.g. a hard disk drive.

Document interface 218, and/or its corresponding application program, may have exclusive access to a transient storage 224, e.g. computer RAM, as a program runs. When document interface 218, or a corresponding application program, may be terminated, either by a user "exit" or by an accidental or malicious termination, IM 222 may be erased.

User 206 may provide input to a document, e.g. adding, deleting or editing content, through IM 222. Upon user 206's completion of an editing session, (or upon user 206's entry of a "save" command), document interface 218 may "check in" or move changes and/or editing back into a DV 210, and may create an updated version of DV 210. At an end of user 206's session, document interface 218 may erase IM 222 from transient storage 224, e.g. IM 222 may be erased or otherwise deleted from RAM of user 206's computer.

In the example of FIG. 2, User 208 may also wish to edit a document. User 208 may receive access to distribution version (DV) 226. For example DV 226 may be a copy of DV 210 updated with changes made by user 206. User 208 may have received DV 226 from User 206 via email, for example. A transition of DV 210 to DV 226, associated with a transition from User 206 to User 208, may be in accordance with a workflow cycle, where such workflow cycle instructions may be included within DV 210, and subsequently within DV 226.

DV 226 may be loaded on storage 228, e.g. on a computer hard drive on a server or other computer, which may be unsecured. User 208 may download DV 226 onto storage 228, e.g. from an email from User 206.

In an embodiment, DV 210 and 226, may also be the same copy. For example, if DV 210 may be maintained on a server, then user 206 may access DV 210 on a server, make changes and add them to DV 210. When user 208 accesses a document in such an example, user 208 would go to the same server, and DV 226 would be the same updated version of DV 210.

DV 226 may ensure, for example by its structure and/or security enabled during its creation, that only authorized users, e.g. authorized workflow participants, may access a document according to their associated granted access rights. DV 226, may, for example, be a *.pex format file in which all content parts may be individually encrypted and/or signed. User 208 may access content parts, for example, if user 208 may provide proper user identification. Where a document may be a composite document that may include a number of different content parts, e.g. components, sub-components, tessellations, etc., DV 226 may ensure that user 208 may access only those content parts within DV 226 that may correspond to user 208's granted access rights.

User 208 may attempt to access DV 226 through an application program having document interface 230, e.g. operated by processor 232. Document interface 230 may generate IM 234. IM 234 may include unencrypted versions (clear-text copies) of content from DV 226 that user 208 may be permitted to access. IM 234 may be created and exist only in transient storage. Transient storage 236 may be, for example, a RAM of a computer or computing device of user 208. IM 234 may exist while user 208 operates an application program, e.g. to review, edit or alter a document.

Document interface 230, and/or its corresponding application program, may have exclusive access to transient storage 236, e.g. computer RAM, as the program runs. When application program 230 may be terminated (either by a user "exit" or by an accidental or malicious termination), IM 234 may be erased and IM 234 may be lost, and no copy may be available.

User 208 may provide input to a document, e.g. adding, deleting or editing content, through IM 234. Upon the user's completion of an editing session, (or upon a user 208's entry of a "save" command), document interface 230, e.g. of an application program, may "check in" or move changes and/or editing back into DV 226, creating an updated version of DV 226. At an end of a user 208's editing session, an application may close and IM 234 may be erased or otherwise deleted from transient storage 236.

Following editing of DV 226, DV 226 may be "checked-in" (or imported) to secure environment 204 by import program 238, e.g. operated by processor 212. MC 202 may be updated with changes that may have been made to DV 226 (which also may contain changes made, for example in a sequence of a document's travel from user 206 to user 208, and/or to other users. Through this process MC 202 may be updated while being maintained in a secure environment. MC 202 may be maintained for an entire duration of a workflow, and then may be merged with updated versions of a document, e.g. DV 226. As part of a workflow, or following a workflow, MC 202, as a full version, a trimmed version, etc., may be archived and/or retained, for example for future reference and/or audits.

Creation of a Distribution Version

A DV may be created from a master copy (MC) of a composite document, and such DV may be created in a secure environment. A MC may remain within a secure environment and a DV may be created within a secure environment to be sent from a secure environment to another secure environment, to an unsecure environment or to an unknown environment. A DV may include security features for all or part of the components of a DV where such security features may be designed to maintain security of components both during transit among environments and within a less secure environment. Such security features may be applied within a secure environment during creation of a DV from a MC. Associations between components of a composite document and security features, and determination of such security features, may be predetermined or may be determined during creation of a DV from a MC.

Figure 3:
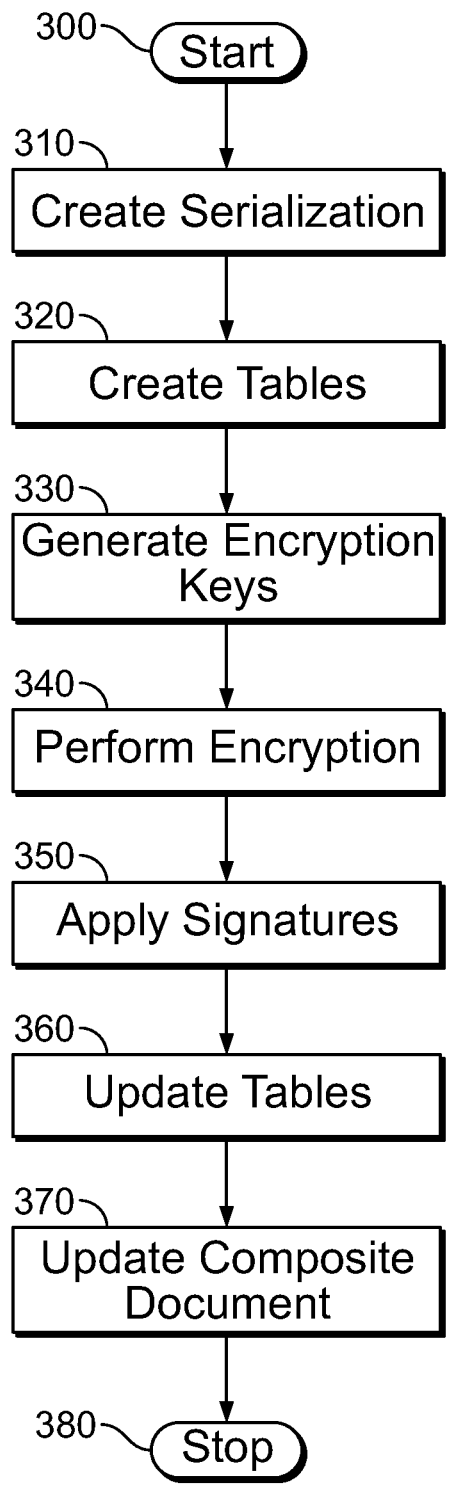
FIG. 3 is an illustration of a structure for a composite document, according to an embodiment of the invention.

Reference is now made to FIG. 3, which is a process flow showing steps for creating a distribution version (DV), according to an embodiment of the invention. In step 310 a processor, e.g. 220, 232 FIG. 2, may create a new serialization, e.g. an SQLite database serialization, and may be for a composite document. Tables may be created in step 320, e.g. an SQLite table. A first table may contain or describe document parts. A second table may contain or describe an entry table, where an entry may be, for example, a key-map entry into a serialization, e.g. access that may be granted to a workflow participant may be reflected by a subset of keys he or she may receive within his or her key-map file. A table may be a separate entry table that may reference individual key-map entries for workflow participants. Each table may be used for other like functions, and other tables are also possible. Encryption keys may be generated in step 330. Encryption and decryption keys may be the same, for example in a case of symmetric encryption. Encryption and decryption keys may be generated in pairs, e.g. a key pair, for example in a case of asymmetric encryption. Parts of a composite document that may be designated as confidential, or with a restricted access, may be associated with an encryption key, and may be included in a table. Other document parts may be included in a table without such a key. Keys may be encryption keys, signature keys, verification keys or other like keys. Encryption may be performed in step 340, where documents and/or document parts designated to have at least a degree of restricted access may be transformed to an encrypted version of each. Encryption may be performed using symmetric key or asymmetric key encryption methods. Signatures may be applied in step 350. An application of a signature may refer to signing of data and/or a creation of a digital signature. Signatures may be applied to encrypted material. Success of signature verification may prove an authenticity of signed data, for example, data integrity, e.g. data was not modified, and, for example, data origin, e.g. who signed it, and which, in an embodiment, may prove that it may have been signed by the last previous workflow participant who may have been granted modify access to this part. In step 360 tables that may have been created in step 320 may be updated. For example, a table containing key-map entries for a workflow participant may be updated with a subset of access keys, corresponding to granted access. Key-map entries may be encrypted and signed, and in some embodiments may always be encrypted and then signed. Key-map entries may be signed by a document master signature key, and may prove to each workflow participant that a document may be originated from a document master. A composite document may be updated in step 370, where parts that may have been encrypted may be stored as an element of a composite document. Encrypted and unencrypted elements may be stored together, e.g. in a *.pex document, and may form a DV.

Figure 4:
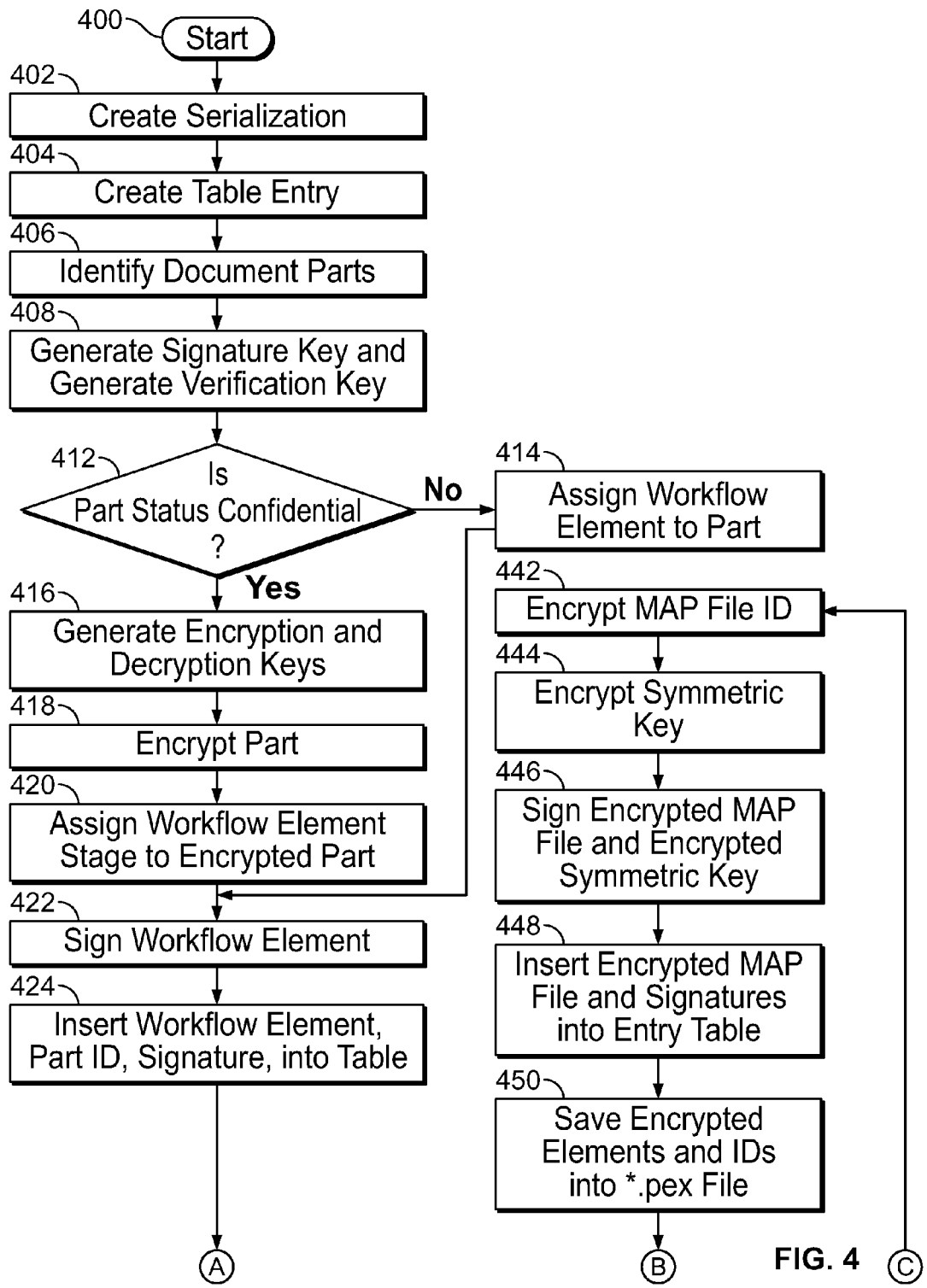
FIG. 4, is an illustration of composite document forms, according to an embodiment of the invention.
Figure 4:
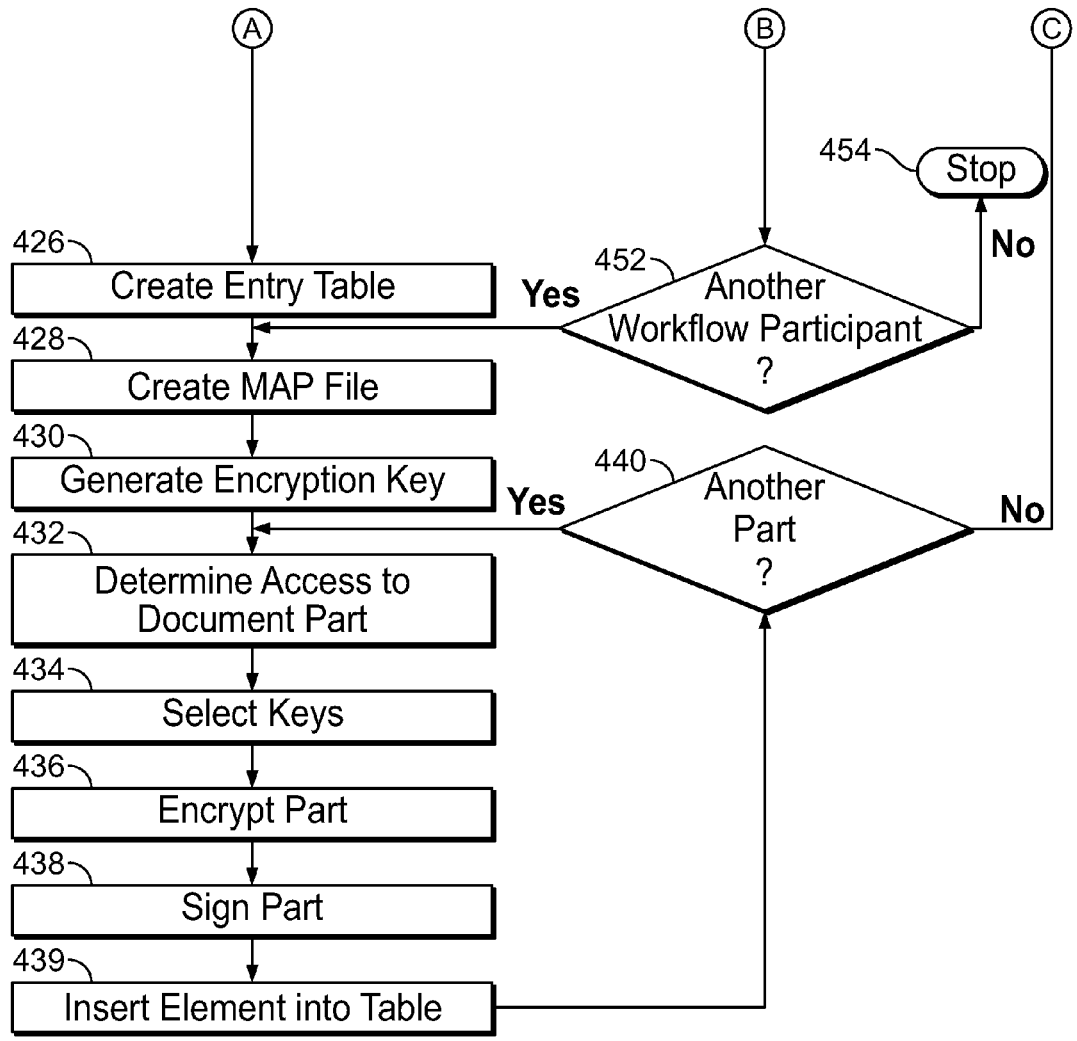

Reference is now made to FIG. 4, which is a process flow showing steps for creating a distribution version (DV), according to an embodiment of the invention. In step 402 a processor, e.g. 220, 232 FIG. 2, may create a new serialization, D, e.g. an SQLite database serialization (FIG. 8), and may be for a composite document, A. A serialization, or parts of a serialization, may originate from a MC of a composite document. A new entry may be a table, $T_1$, in serialization D that may be created at step 404, e.g. $T_1$ may be an SQLite table. A table $T_1$ may be designated for containing document parts, and such parts may be of any complexity, and may include logical parts, for example from one or more traditional files or may span among two or more traditional files, or file fragments (incomplete file formats). Each part, $P_i$, of document A may be identified at step 406, and may have an indexed identifier, i, or indexed part identifier. Indexed identifier, i, may refer to a number of parts of a document. For each part, $P_i$, a signature key, $S_i$, may be generated, and a verification key, $V_i$, may be generated at step 408. In some embodiments, a signature key and a verification key may be generated together, e.g. as a pair, or separately, and step 408 may be performed as a single step, or as separate steps. Other steps may be separated and/or combined functionally during performance of some embodiments. A first key associated with a part, $P_i$, may be identified by an access restriction identifier, $R_{1i}$, where $R_{1i}=\{\{S_i,V_i\}\}$. Each document part may be associated with a signature key and a verification key. A determination may be made at step 412 if a status of a part, $P_i$, is confidential. If such part is not confidential or not designated with a similar access restriction status, a workflow element, $W_i$, may be assigned to a part, $P_i$, at step 414, for example where $W_i=P_i$ may represent a workflow element $W_i$ being assigned to a clear part $P_i$, or rather part $P_i$ may be stored as part of a workflow in the clear, or unencrypted. If such a part has a status of confidential, or is designated with a similar access restriction status, a new encryption key, $E_i$, and a new decryption key, $D_i$, may be generated at step 416. An access restriction identifier, $R_{2i}$, may be assigned to such an encryption/decryption key pair, for example where $R_{2i}=\{E_i,D_i\}$. Using an encryption key, $E_i$, a part, $P_i$, may be encrypted at step 418. A workflow element $W_i$ may be assigned to an encrypted version of a part, Pi, at step 420, for example where $W_i=encr_{Ei}(P_i)$. A workflow element, $W_i$, that may have been assigned to a clear part or to an encrypted part may be signed at step 422, using a signature, $H_i$, for example where $S_i=\text{sign}(W_i)$. A workflow element, $W_i$, index, i, and a signature, $H_i$ all associated with a part, $P_i$, may be inserted to a table, $T_1$, at step 424.

At step 426 a new table, $T_2$, may be created in serialization D, e.g. $T_2$ may be an SQLite table. Table $T_2$ may be designated for containing an Entry-Table, and may refer to entries and/or access associated with workflow participants, users, etc. Each workflow participant may be designated by an index, j, and each j may correspond to an entry in table $T_2$. A map file may be created at step 428, where $M_j$, may be a new entry created in table $T_2$. $M_j$ may also be an SQLite table, or any combination thereof, or combinations among similar constructions. For example, $M_j$ may be an SQLite table that may contain a corresponding map file, and may be a new entry in serialization D. An encryption key, Qj, may be created at step 430, and may be a symmetric encryption key, e.g. an Advanced Encryption Standard (AES) key. An encryption key may, for example, be in accordance with a Public Key Infrastructure (PKI), or other like standards. For each part, $P_i$, of document A, access and/or encryption may be reviewed with reference to a participant, j. Granted and/or required access, $G_{ij}$, to a document part, $P_i$, may be determined at step 432, for a participant, $U_j$. A subset of keys may be selected at step 434 that may correspond to granted access $G_{ij}$, for example where $R=\{R_{1i},R_{2i}\}$ may be keys, and may be a subset of $\{\{E_i,D_i\},\{S_i,V_i\}\}$, or $R=\{R_{1i},R_{2i}\}\in\{\{E_i,D_i\},\{S_i,V_i\}\}$. If a status of a part, $P_i$, is "clear", and access is "read only", select $R=\{\{V_i\}\}$. If a status of a part, $P_i$, is "clear", and access is "read/write", select $R=\{\{S_i,V_i\}\}$. If a status of a part, $P_i$, is "confidential", and access is "no access", select $R=\{\{V_i\}\}$. If a status of a part, $P_i$, is "confidential", and access is "read only", select $R=\{\{D_i\},\{V_i\}\}$. If a status of a part, $P_i$, is "confidential", and access is "read write", select $R=\{\{E_i,D_i\},\{S_i,V_i\}\}$. Using keys R, index i, and part name, e.g. $P_i$, may be encrypted at step 436. Each element being encrypted by keys R may be encrypted separately or together. An encrypted part, encrypted by keys R, may be signed at step 438 using a master document key, for example where $\text{signature}_{ij}=\text{sign}$ (encrypted{part id i, part name, R}). An encrypted element, encrypted by key Ei and signed by Si together with the generated signature may be inserted into a table $M_j$, at step 439. A determination may be made at step 440 whether there is another part of a document, and if so, steps 432 through 439 may be repeated for each other part.

A map file, a map file identifier and/or a key word, for example {MAGIC_WORD, id of $M_j$}, may be encrypted using a key, $Q_j$, at step 442. Key, e.g. symmetric key, $Q_j$ may be encrypted at step 444 using a workflow participant j public key. Using a document master signature key, an encrypted map file and an encrypted symmetric key may be signed at step 446. An encrypted map file, {MAGIC_WORD, id of $M_j$}, and an encrypted, e.g. from a document master key, signature of an encrypted map file and an encrypted symmetric key, may be inserted into a table, $T_2$, at step 448. Encrypted elements and/or associated identifiers may be saved into a file, e.g. a *.pex file at step 450. Such elements being saved into a *.pex file may be referred to, for example, as being saved into a "big table" or another table, e.g. a "parts together" table, which may be a table that shows logical locations and relationships among parts of a document. Exemplary elements of a "parts together" table may be Part I represents bytes 1-345 and 788-1023, Part II represents bytes 346-787 and 4523-5672, Part III represents bytes 1024-3412, etc. At step 452 a determination may be made whether there may be another workflow participant, and if so, steps 428 through 450 may be repeated for each participant.

Individually accessible content-part entries, $P_i$, may each be encrypted and then signed by its own encryption and signature keys, where such keys may be specially generated for such content-part.

Key-map entries, $M_j$, may be subsets of content-parts access keys, and may correspond to workflow participants' granted accesses. In a case of an unordered workflow, such entries may be accessible directly at a top level of PPCD serialization. In a case of an ordered workflow, such entries may be combined into a workflow wrap. Each key-map entry may be encrypted by an associated key and signed by a document master signature key. Each key-map entry may be accessible by a particular workflow participant, or exclusively by a particular, or designated, workflow participant. Such accessibility may be ensured by performing encryption by an associated encryption key, where such key may be associated with a particular workflow participant. Key-map entries may not be expected to be modified outside of a secure environment, where such expectation may be in contrast to an expectation of where content parts of a document may be modified.

An entry table may be used, for example, for a fast identification of individual key-map entries by workflow participants. Such identification may be beneficial for large workflows, where, for example, participants may be allowed to access a document, or document parts, in no particular order.

Accessing a Distribution Version (DV)

Figure 5:
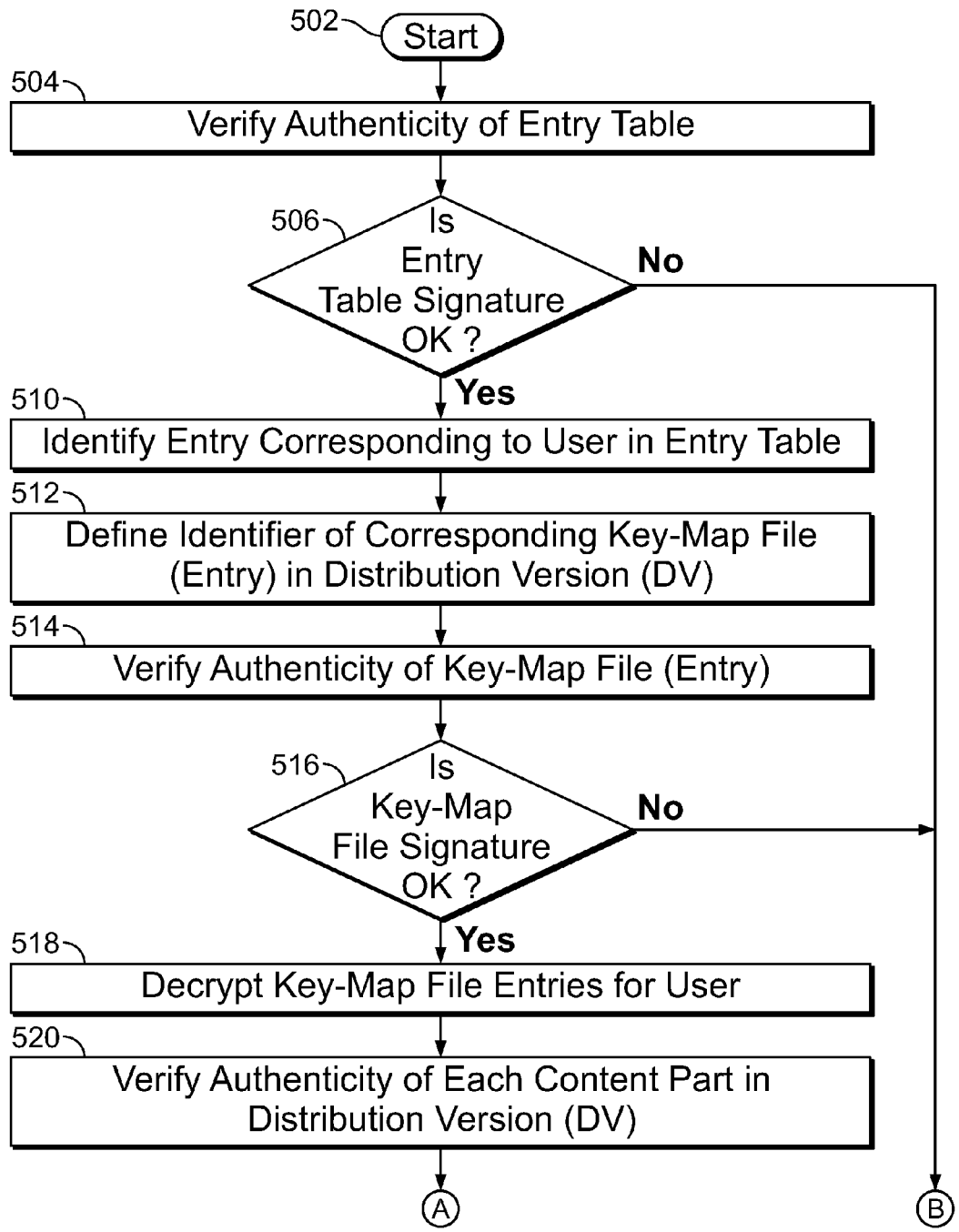
FIG. 5 is an illustration of a composite document serialization structure, according to an embodiment of the invention.
Figure 5:
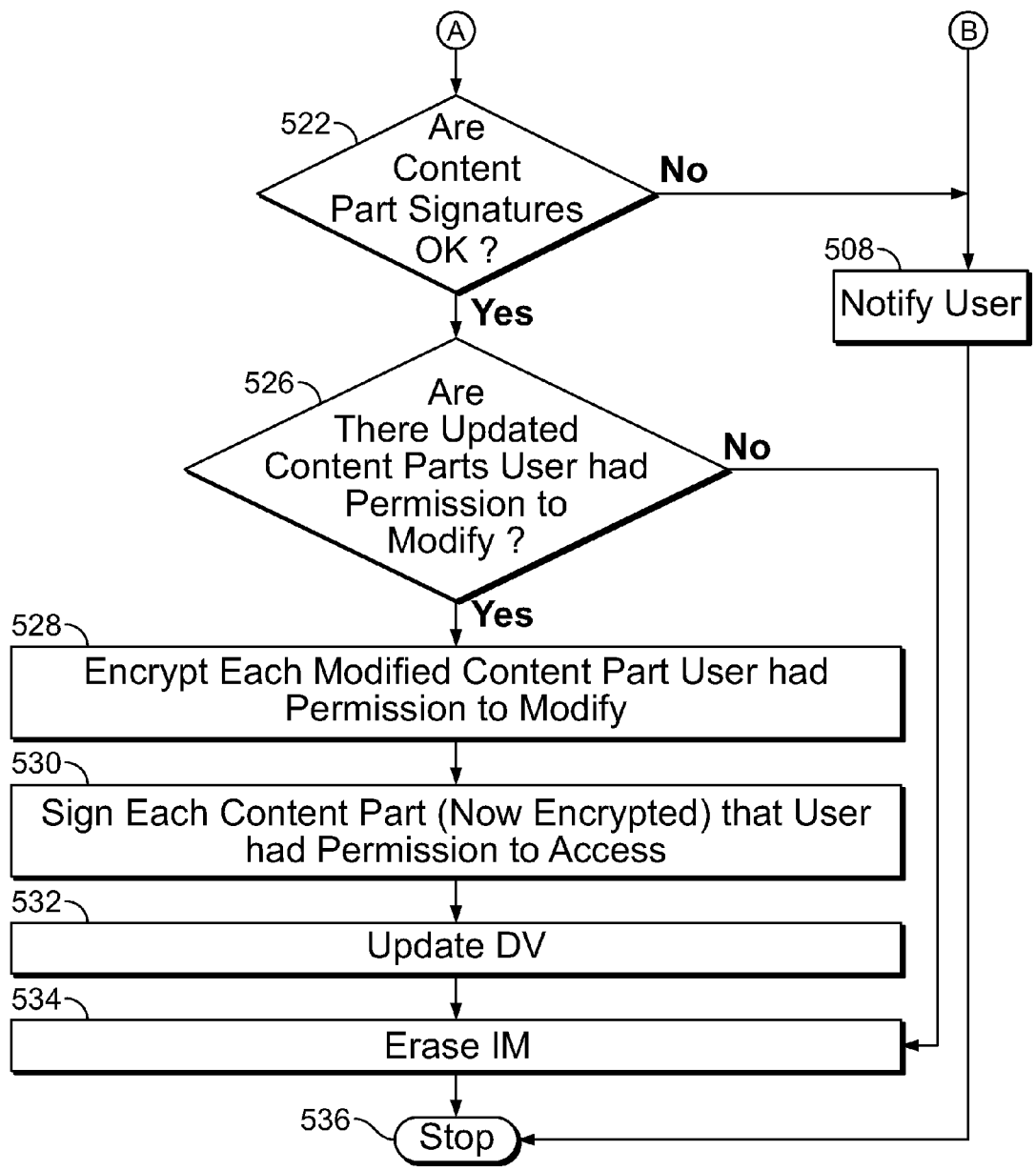

Reference is now made to FIG. 5, which is a process flow showing steps for accessing a distribution version (DV), according to an embodiment of the invention.

Figure 6:
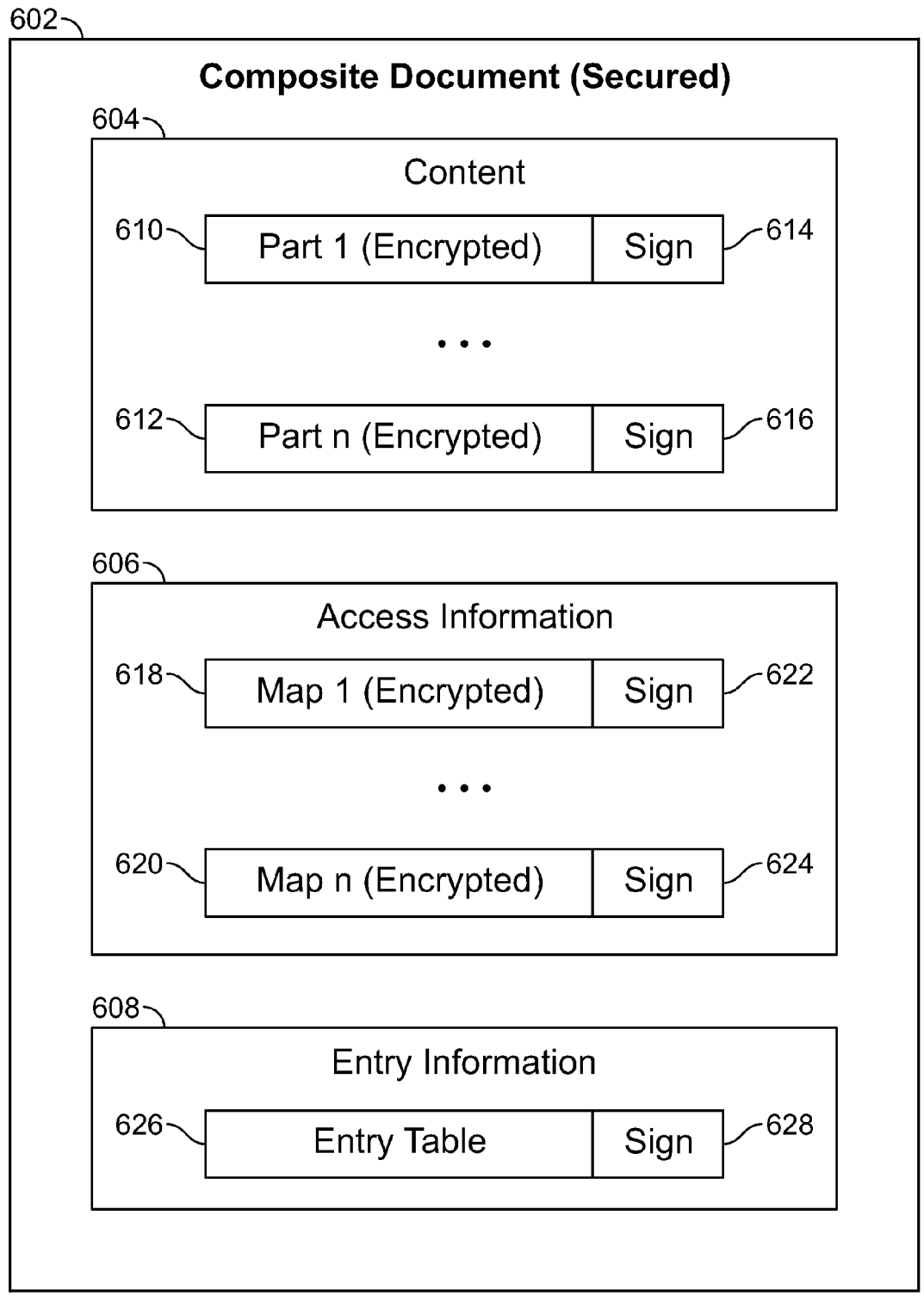
FIG. 6 is a process flow showing steps for creating a distribution version, according to an embodiment of the invention.
Figure 7:
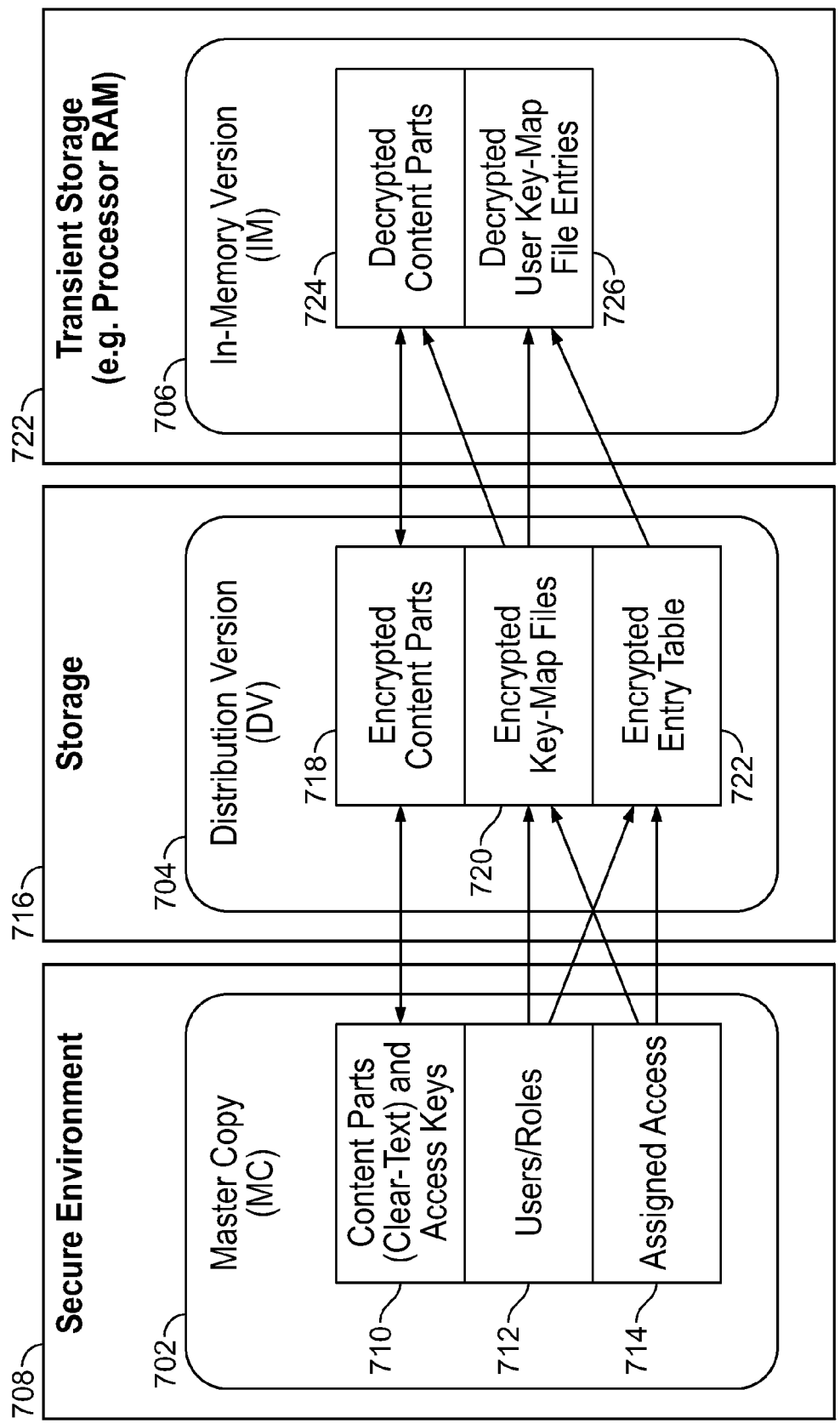
FIG. 7 is a process flow showing steps for creating a distribution version, according to an embodiment of the invention.

A process begins in step 502 and in step 504, a processor, e.g. 220, 232 (FIG. 2), accessing a document interface may first check an authenticity of an entry table, e.g. 626, FIG. 6, 722 FIG. 7. As described with reference to FIG. 6, an entry table may provide a fast way for a user to identify his or her key-map file (entry in the DV) while preserving user anonymity. If in step 506, a processor may determine that a signature for an entry table may not be valid, a processor may notify a user in step 508 and terminate a procedure at step 536.

If a signature for an entry table is verified to be valid, an entry corresponding to a user in the entry-table may be identified in step 510 using, for example, a user's private decryption key. In step 512, an identifier (ID) of a key-map file (a key-map file entry within the DV) for a user may then be defined.

In step 514, a processor may verify authenticity, e.g. integrity and/or origin, of this key-map file that may correspond to a user (and found from an identifier obtained in step 512).

If in step 516, a processor may determine that a signature for a key-map file (entry for the key-map file in a DV) may not be valid, a processor may notify a user in step 508 and terminate a procedure at step 536.

If a signature for a key-map file is verified to be valid, a processor may then, in step 518, decrypt a key-map file (the user's key-map entries in a DV) using a key Qj recovered from an entry table.

A key-map file may contain verification keys for content parts and part access keys (and other keys, e.g. decryption, encryption and/or signature keys for content parts that a user may have RW access to and decryption keys for content parts a user may have RO access to). Using verification keys found in a user's key-map file, a processor in step 520 may verify an authenticity of each of content parts in a DV. In one example, each of the content parts within a DV may be verified regardless of whether a user may have RW, RO or NA access.

In the example of step 520, a processor may perform a step of verifying DV content parts based on information in a user's key-map file. In another example, an authenticity of content parts of a DV may be verified in other points in a process. If in step 522, a processor may determine that a signature for any one of the encrypted content parts, e.g. content parts 610, 612, FIG. 6 or 718 FIG. 7, may not be valid, a processor may notify a user in step 508 and terminate a procedure at step 536.

If at step 522, a processor may determine that signatures for content parts may be valid, a processor may proceed to step 526. A user, e.g. accessing the in memory (IM) through a graphical user interface (GUI) of an application, may have an opportunity to review and edit parts of a DV that may have been made available to him or her. For example, if a key-map file entry data provides a user RW (read/write access) to a particular part, he or she is allowed and/or able to edit and change that part.

In step 526, a processor may determine if there are any content parts currently stored in the IM (in decrypted form) that may have been updated and which a user may have permission, e.g. RW access, to modify. If, in step 526, a processor may find that no content part in an IM may have been modified, a processor may proceed to step 534, to erase (or otherwise delete) an IM and then terminate in step 536.

If, in step 526, IM content parts (that the user had permission to modify) may have been modified, a processor may update a DV and "check-in" updated content parts. For example, a processor in step 528 may encrypt each modified part a user may have permission to modify, e.g. using the encryption key for each part provided within a user's key-map file in an original DV. A processor may then, in step 530, sign each updated part using the corresponding signature key, where an associated signature verification key may provide to a next workflow participant an assurance of authenticity. Such authenticity may refer to, for example, an assurance that a version a next user may receive is a version that was "checked in," updated and signed by the last workflow participant with the granted modify access.

With parts encrypted and signed, a processor may proceed to step 532, where encrypted parts may be loaded into a DV, e.g. keys may not be loaded back into a DV, only parts. Keys may be discarded together with a document data in memory. Following an update of DV processing, transient memory may be erased (in step 534) and a process may terminate in step 536. If an ordered workflow may be followed, for example according to a workflow cycle, there may be a workflow wrap. When a workflow wrap may be present, a next step of an ordered workflow wrap may be recovered and replaced back into a DV.

It may be noted that in the event of a crash, occurring for example as a result of a software bug or accidental malicious termination of the application processes, memory allocated for an application and an IM may be reclaimed back by an OS and may not be made available and/or accessible to any other processes. In such an example, no sensitive data leak may occur. To avoid losing a user's work due to, for example, an accident crash, a save function, e.g. an Autosave option, may be used for an intermediate save of parts' updates. Such updated parts may be uploaded to a DV as described herein, and neither an IM document version of a document, or parts access keys may be discarded during an autosave, Composite File Structure Reference is now made to FIG. 6, which illustrates a structure for a composite document, according to an embodiment of the invention. FIG. 6 depicts composite document 602, which may include content parts 604, access information 606, e.g. map files, and entry-table information 608. Each of content parts 604, access information 606 and entry-table information 608 may include one or more separate files, which may be organized together into a document serialization, e.g. such as in a database implementation, for example, an SQLite™ file or in a file following the *.pex file format. FIG. 6 shows content parts 604, access information 606 and entry information 608 all in encrypted forms, and as such, composite document 602 may be a secured, distribution version (DV) of a composite document.

Content parts 604 may include items (components, subcomponents, tessellations, etc.) that may make up content of composite document 602. A component may be any a digital object, such as, for example, a text file, file or document created with a word processing program, file or document created with a presentation program, spreadsheet file or document, image document, audio file, resource file, style file or any other digital or digitally represented object, or parts within (as described herein).

A component may have subcomponents, e.g. a column within a spreadsheet file, and composite document 602 may manage subcomponents separately from a parent-component. Groups of components and sub-components may be organized together into tessellations, e.g. to save on a number of individual parts of a composite document. Tessellations may include multiple individual component files and/or sub-components (file fragments) that may share, for example, a same access control across a workflow. A composite document, e.g. composite document 602, may be included as a content part, and be separately encrypted, inside of another composite document. Such "nesting" of composite documents may be in accordance with a workflow.

Content parts 604 may include content parts 1 . . . n. FIG. 6 shows content parts: Part 1 (610) and Part n (612). Part 1 (610) may be a text document, e.g. a Word™ (*.doc) file. Part n (612) may be a spreadsheet document, e.g. an Excel™ (*.xls) file. Other combinations of components, sub-components and/or tessellations are also possible. For example, it may be also possible that each of parts 1 . . . n, e.g. 610, 612, may be tessellations, where each tessellation may include multiple component files and/or sub-component files.

Users may have different access rights to each of the content parts. For example, for each part, a user may have certain access privileges, such as:

RW (read/write access): e.g. a user may open (review) a content part and/or make modifications;

RO (read only access): e.g. a user may open and review a content part, but not make changes; or NA (no access): e.g. a user may not open a content part at all, user may (and in an embodiment, e.g. must) review and/or verify an authenticity of any such part.

To control a user's access to a content part, e.g. 610, 612, a content part may first be encrypted by its own assigned encryption key (E). Users, e.g. workflow participants, who may receive a decryption key (D), corresponding to encryption key E, may access a content part, e.g. decrypt it and read it. In addition, other keys may be employed. For example, users, e.g. workflow participants, who may have been given no access privileges to any part of composite document 602 may still have a need to verify the authenticity of a document (or the content parts).

For example, a user receiving a DV, such as a secured composite document 602, may need, e.g. as part of a workflow, to verify authenticity of a content part (even if they have no access) immediately upon reception. Such verification of authenticity may be needed, because content parts, e.g. 610, 612, may have been modified without authorization by either a previous user (previous workflow participant) or by another person while a document may be in transition.

One mechanism, in addition to assigning an encryption key (E) and a decryption key (D) for each part, may be to assign further a digital signature key (S) and a digital verification key (V) for each part. A digital signature, that may be properly verified, may provide a user receiving a content part, e.g. 610, 612, reason to believe that a content part may be authentic, e.g. modified by one of the previous workflow participants who may have been given rights to modify this part, and a content part may not have been altered in transit or may not have been altered by a previous workflow participant who may not have been given a right to change this part. A benefit may be identities of workflow participants may be protected for privacy by using such a digital signature mechanism, since once a signature is verified other identifying information about a previous workflow participant may be unnecessary.

A content part or other element may be "signed" using a digital signature key, e.g. key S, and a user may verify an authenticity of a signed part using a verification key, e.g. key V. Such a content part may be first encrypted and may then be signed, and verification may be (and in an embodiment, e.g. must be) performed whether a user has read/write (RW), read only (RO) or no access (NA). Access control for a content part may be enabled, in an embodiment of the invention with a control scheme using, for example, four keys: Encryption (E), Decryption (D), Signature (S) and verification (V).

A part may be encrypted by a symmetric key (which may be both an encryption and a decryption key) and then signed. A user with NA (no access) to a particular content part may be provided a given signature verification key for that content part, so that he or she may verify authenticity. A user may be given RO (read only access) for that particular content part, and may be provided with a decryption key (which may also serve as an encryption key if symmetric encryption is used) and signature verification. Such a user (with RO access) may verify a content part's authenticity using a signature verification key, then decrypt a part and read its contents. However, a RO user may not update (modify, edit, etc.) a content part as he/she may not have a signature key. A user with RW (read-write access) may be provided with an encryption key (usable also for decryption) and pair of signature verification keys. An RW user may verify authenticity, decrypt, edit, encrypt and then sign an updated version.

Systems and methods for providing differential access to a digital document and systems and methods for application of differential policies to a digital document may be described in Pending International Application Serial No. PCT/US2010/049638, titled "PROVIDING DIFFERENTIAL ACCESS TO A DIGITAL DOCUMENT", filed Sep. 21, 2010 and Pending International Application Serial No. PCT/US2010/49669, titled "APPLICATION OF DIFFERENTIAL POLICIES TO AT LEAST ONE DIGITAL DOCUMENT", filed Sep. 21, 2010 which are each hereby incorporated by reference in their entirety.

Content parts of a composite document may be separately encrypted in a distribution version (DV). Each content part may be also signed by its own digital signature key. For example Part 1 (610) may be encrypted with its own encryption key $E_1$ and signed, e.g. at 314, with its own digital signature key $S_1$. Likewise, Part n (612) may be encrypted with its own encryption key $E_n$ and signed, e.g. at 416, with its own digital signature key $S_n$.

Access information 606 may contain user access information for a document's component parts. One or more key-map files may be generated for each user who may be permitted to access a composite document, e.g. each participant in a workflow. Access may be in accordance with a workflow cycle, and may be predetermined. Access information 606 may include key-map files 1 . . . j, e.g. corresponding to users 1 . . . j. FIG. 3 shows key-map files, Map 1 (618) and Map j (620). Each key-map file may include, for example, one entry per content part. Each entry may contain, for example, a content part name, e.g. name/id, identifier, and a number of keys that may correspond to access rights granted to a user, e.g. workflow participant, for a particular part. In an example that may include RW, RO and NA access, there may be, for example, the following types of entries for access keys:

For RW (read/write access): an entry may contain a content part name ($part_i$) and keys: $E_i$, $D_i$, $S_i$, $V_i$;

For RO (read only access): and entry may contain a content part name ($part_i$) and keys: $D_i$, $V_i$; and For NA (no access): an entry may contain a content part name ($part_i$) and key $V_i$ (e.g. where a content part name may be a label assigned in the serialization and not a real file name).

Map table entries may have coding as in XML format and other coding formats may be used, e.g. comma-separated values (CSV), SQL, etc. A key-map file for each user may be encrypted using a known user public encryption key, or using hybrid encryption, e.g. data may be encrypted by a specially generated symmetric encryption key, which may then be encrypted using a user's public encryption key. Each encrypted key-map file may be then placed into a document serialization, e.g. and saved as an SQLite™ file or *.pex file, as a separate entry.

In FIG. 6, key-map files, Map 1 (618) and Map j, (620) are shown to be encrypted, e.g. using known public encryption keys of corresponding workflow participants. In addition, Map 1 (618) and Map j (620) are shown to have also been signed, e.g. at 622, 624, respectively, using digital signature keys. Key-map entries may be a signed document master signature key, and other signature key arrangements are possible.

In addition, composite document 602 may further include entry information 608. Entry information 608 may provide a way for each user to obtain access to his or her key-map file(s) within a composite document 602, while still maintaining privacy for users. Within composite document 602, each user, e.g. each workflow participant, may be able to identify an associated map-entry in order to able to access a component document part. Decrypting each key-map file until a correct key-map file is found may be computationally expensive. Having a user's username or other identifying information associated with a key-map file for a user may compromise security and potentially expose identities of workflow participants.

A fast filtration entry may be provided in an embodiment by encrypting, for example, a small known string of characters, a "magic" string, for each user. Each user may attempt to decrypt these strings in turn until a correctly decrypted one may be found. An entry table may be subdivided into records, each of which may consist of separate cells that may include, for example: 1) A "magic word" in clear text form; 2) A same "magic word" encrypted and 3) User entry information containing corresponding map file name and/or id, its decryption key, and/or signature verification (optional) keys. To identify a user's entry, e.g. a record in an entry table, it may be sufficient to decrypt only an encrypted "magic word" and compare it with a corresponding "magic word" value from a clear text cell in the same record. FIG. 6 depicts table entry 626, which, before encryption, may look like the above. Entry 626 may include a corresponding key, e.g. a symmetric key (that may be used to encrypt/decrypt the user's map file). Digital signature 628 has been made for table entry 626, to verify a table entry's authenticity.

Reference is now made to FIG. 7, which illustrates elements of master copy (MC) 702, distribution version (DV) 704 and in-memory version (IM) version 706 of a composite document, according to an embodiment of the invention.

MC 702 may be a master copy of a composite document. MC 702 may include one or more content parts 710, and access keys to associated content parts, a user/role index 712 and an assigned access index 714. An MC may be a document from any authoring environment. A program such as a document master may bundle one or more separate documents, e.g. a text document (a Word™ *.doc) and/or a spreadsheet document (an Excel™*.xls), into a single composite document (master). Documents may be provided, for example, from a document repository that may have enforced access control. In such an example, a subset of documents from a repository, and/or their parts, may be combined into an MC. In an embodiment, software such as HP Exstream™ from Hewlett-Packard Company of Palo Alto, Calif. may, for example, be used to prepare a composite document master. In some embodiments, an MC may be created as a virtual entity that may reference secure resources, e.g. required secure resources, on a system, computing system, etc.

Users, e.g. participants in a workflow, may have limited (extremely controlled) or no access to MC 702. Accordingly, elements of MC 702 may have no encryption and, for example, each of parts 710, user/role index 712 and assigned access index 714 may be stored with no encryption in a secure environment 708. Control to MC 702 may be protected and/or enforced by any standard access control mechanism.

Content parts 710 may include unencrypted, "clear-text" versions of all of the document's content parts, e.g. components, sub-components, tessellations, etc. In addition, content parts 710 may include substantially all of the access keys corresponding to composite document parts, e.g. encryption key (E), decryption key (D), signature key (S) and verification key (V). For example, MC 702 may be physically or virtually created, e.g. on the fly or in real time. Keys assigned to each user may be kept for safety (backup) within a secure environment, or within an MC, e.g. in 710, or discarded.

User/role index 712 may list every user who may access a document, e.g. according to a workflow, and a description of their role. This could be implemented, for example, using role-based access control (RBAC), discretionary access control (DAC), mandatory access control (MAC), etc., or any form of access control that may be available in a secure environment. For example, one user may be a proofreader responsible for proofreading all text, and another user may be an economist, responsible for review of all economic data (and charts) in a document. Users may be part of an electronic workflow, where roles of each user may be monitored. Roles in a workflow, for example, may determine or affect security access rights a particular user may have. A workflow may be defined, for example when MC 702 may be created.

Users may be from different organizations, for example, such that users may be known by their reliable contact address, e.g. a postal address for CD/DVD shipment or an e-mail address. Or, for example, users may be known by their public encryption key, e.g. in a form of public key certificates.

Assigned access index 714 may provide a listing of security access rights each user may have in each part of a composite document. Users may have different access rights to each of content parts 710 (component, sub-component, tessellation, etc.). A user may have access privileges to each content part, such as RW, RO, NA access.

DV 704 may originate from MC 702. DV 704 may represent a secured version of MC 702. DV 704 may be loaded on to storage 716, e.g. such as on a computer hard drive on a server or other computer, which may be unsecured or which may have only limited security. A user may request access to a document, e.g. MC 702 and an electronic workflow system may generate DV 704 and make it available to a user. DV 704 may be sent to a first user, e.g. a first workflow participant, by, for example, email, posted on CD/DVD or USB, etc. Once a first workflow participant may have provided input, he or she may send DV 704 to a next workflow participant, then to a next workflow participant and so on. In many cases, once a document workflow may be accomplished a final DV may be imported back into an original environment and may be merged with an original document, or may replace it, or both versions may be kept. A re-import to an original environment may not be mandatory, but may be a sound solution for many document workflows. Following a re-import to an original environment, DV 704 may be merged with MC 702, and may occur according to a workflow cycle.

Where a document may be a composite document, DV 704 may ensure that a user may access content parts within DV 704 that may correspond to a user's granted access rights. DV 704 may include encrypted content parts 418, encrypted map-files 720 and/or encrypted entry table 722. A configuration may, for example, follow a structure described with reference to FIG. 6.

IM 706 may be created and exist only on a transient storage 722, which may be processor memory such as processor RAM. To generate IM 706, document interface, e.g. 218, 230, FIG. 2, may locate a key-map file corresponding to a user in a document serialization (DV 704). By decrypting key-map file for a user, e.g. 720, an application, e.g. using a document interface, may then access and decrypt those parts of encrypted content parts 718 to which a user, may specifically, have access. Using key entries found in a decrypted user's map-file 726 (decrypted user map-file entries), for example, a document interface may retrieve for display those decrypted content parts 724 that may be available to a user, for example by virtue of access that may be permitted by the keys. When an application may be terminated (either by a user exit or by an accidental or malicious quit), IM 706 may be erased.

Serialization

A composite document may be "serialized" to create a single document unit that may be sent, or made accessible, to users. Currently existing composite formats, such as ePub Open eBook Publication Structure (OEBPS) Container Format (OCF) 1.0 (from International Digital Publishing Forum (IDPF)), or HP Dialogue Live format (from Hewlett Packard Company of Palo Alto Calif.), may collect a set of files, that may comprise a corresponding document, into a single file container through, for example, a zip-archive serialization.

Such file formats may have shortcomings for a secure composite document. For example, a zip-archive may impose a mandatory top-level compression on its entries, which may create a computational overhead often without any size reduction for encrypted data. Where there may be many parts to a composite document having many relationships, a relational database may provide a simple and coherent way to handle such strongly relational data.

While many relational databases (Oracle, Microsoft Access, MySQL, H2, etc.) may be available and may be suitable for an embodiment of the invention, some aspects may be considered. Many databases, especially enterprise oriented databases, may operate using a client-server model and may require professional installation and maintenance. It may be impractical, at times, to run such a server for each document on each customer, or user, machine. In such circumstances, a local access, single flat-file database may be preferable. A flat-file database may be a database, e.g. set of database tables and/or files, that may be encoded as a single file.

One set of processes that may be usable in implementing an in-memory database model is the SQLite™ library by the SQLite Development Team (www.sqlite.org). SQLite serialization may facilitate clear relationships between document components without data redundancy: data items and keys may be all stored once and may be referenced only through corresponding primary keys. Using SQLite, as just one example of a possible structure for document serialization, a disk footprint of SQLite, may be relatively small, e.g. approximately 225 kilobytes (kB), which may be compared to approximately 1 megabyte (MB) for H2. SQLite has been made available in Open Source, including a Mozilla Firefox™ plug-in.

Figure 8:
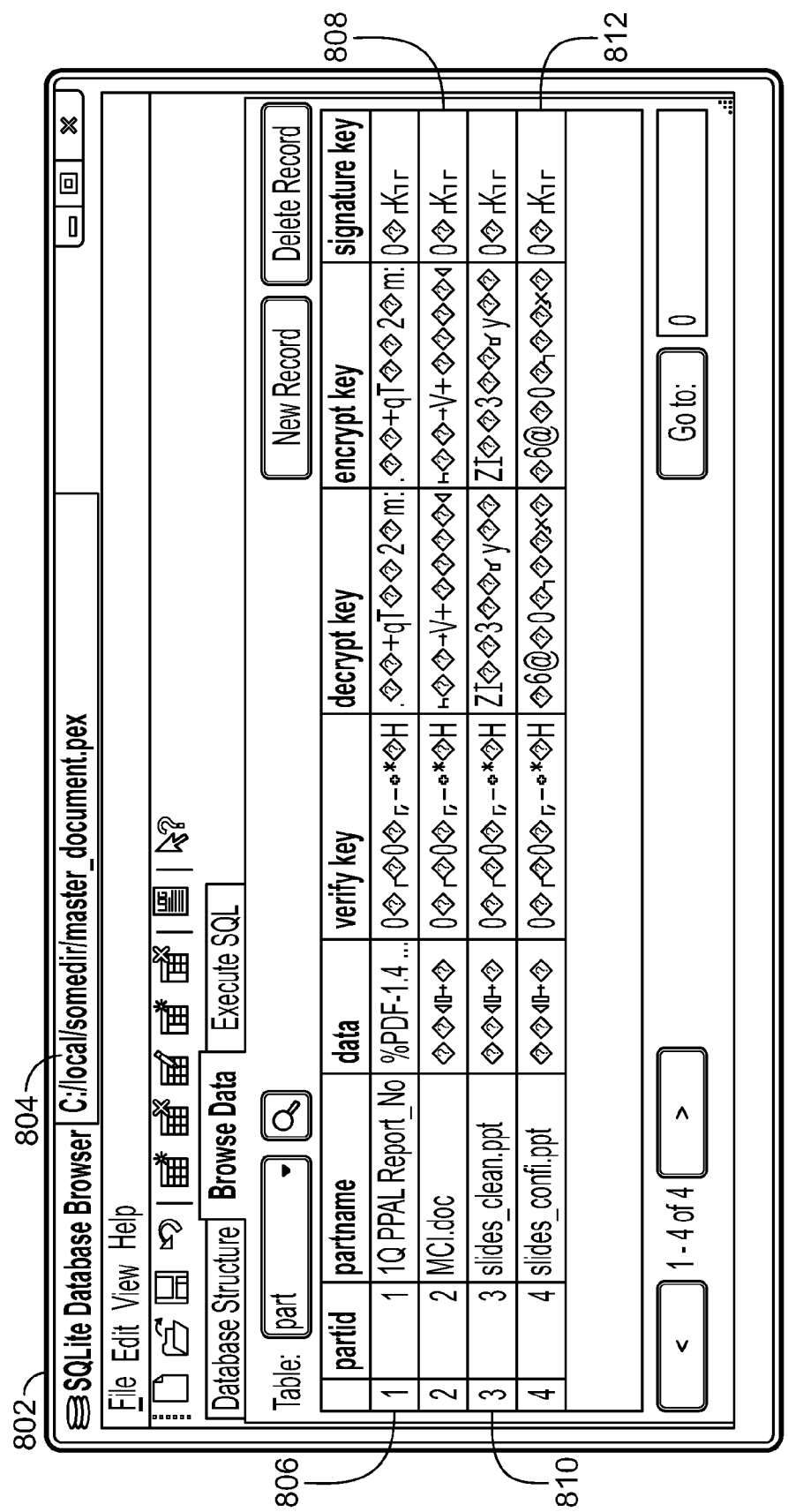
FIG. 8 is a process flow showing steps for accessing a distribution version, according to an embodiment of the invention.

Reference is made to FIG. 8, which is an illustration of a composite document serialization structure as shown in an SQLite Manager Mozilla Firefox plug-in. FIG. 8 depicts an SQLite Manager window (window 802), which may be an access window for a composite document. A serialization file name may be shown at 804. Window 802 may show, for example, that this composite document may include four content parts 806, 808, 810, 812, which, in this example may be individual files (components). For example, content part 806 may be a PDF file. Content part 808 may be a *.doc file (from Word™ by Microsoft). Content parts 810, 812 may be *.ppt files (from PowerPoint™ by Microsoft). Although content parts 806, 808, 810, 812 may be components in this example, in other examples, content parts 806, 808, 810 and 812 may also be tessellations (groups of components and/or sub-components) or combinations of tessellations and components, for example.

For each content part 806, 808, 810, 812, keys pertaining to those component parts, e.g. a verification key (V), a decryption key (D), an encryption key (E) and a signature key (S), may also be shown (in encrypted form). For example, when a DV may be created and/or generated from an MC, each content part in a DV may be assigned its own keys, be encrypted and be signed. Corresponding subsets of keys for each user (workflow participant) who may access a document may be formed into key-map files, which may be also encrypted, signed and placed into a DV. Access to, and sequencing of, keys, including encryption and/or decryption, may be performed in accordance with a workflow cycle.

As revealed by file name 804, a composite document shown may be saved as a *.pex document. With a .pex format document, .pex documents may be aggregated as needed per a workflow. A .pex document may include components, such as *.jpeg, *.pdf, *.doc, *.html, etc. files. These individual files may be considered atomic units in a document. Elements within documents, such as fields within *.pdf forms, cells or columns within *.xls spreadsheets, may also be treated as individual atomic units within a *.pex document. Thus, individual atomic units may consist of multiple files, single files, file fragments (e.g. xml-nodes), fields or elements within files, or any combination thereof. Atomic units may be aggregated into tessellations, or logical tessellations, where tessellations may comprise two or more of atomic units using the same security key, etc.

Document Lifecycle Process Flow

Figure 9:
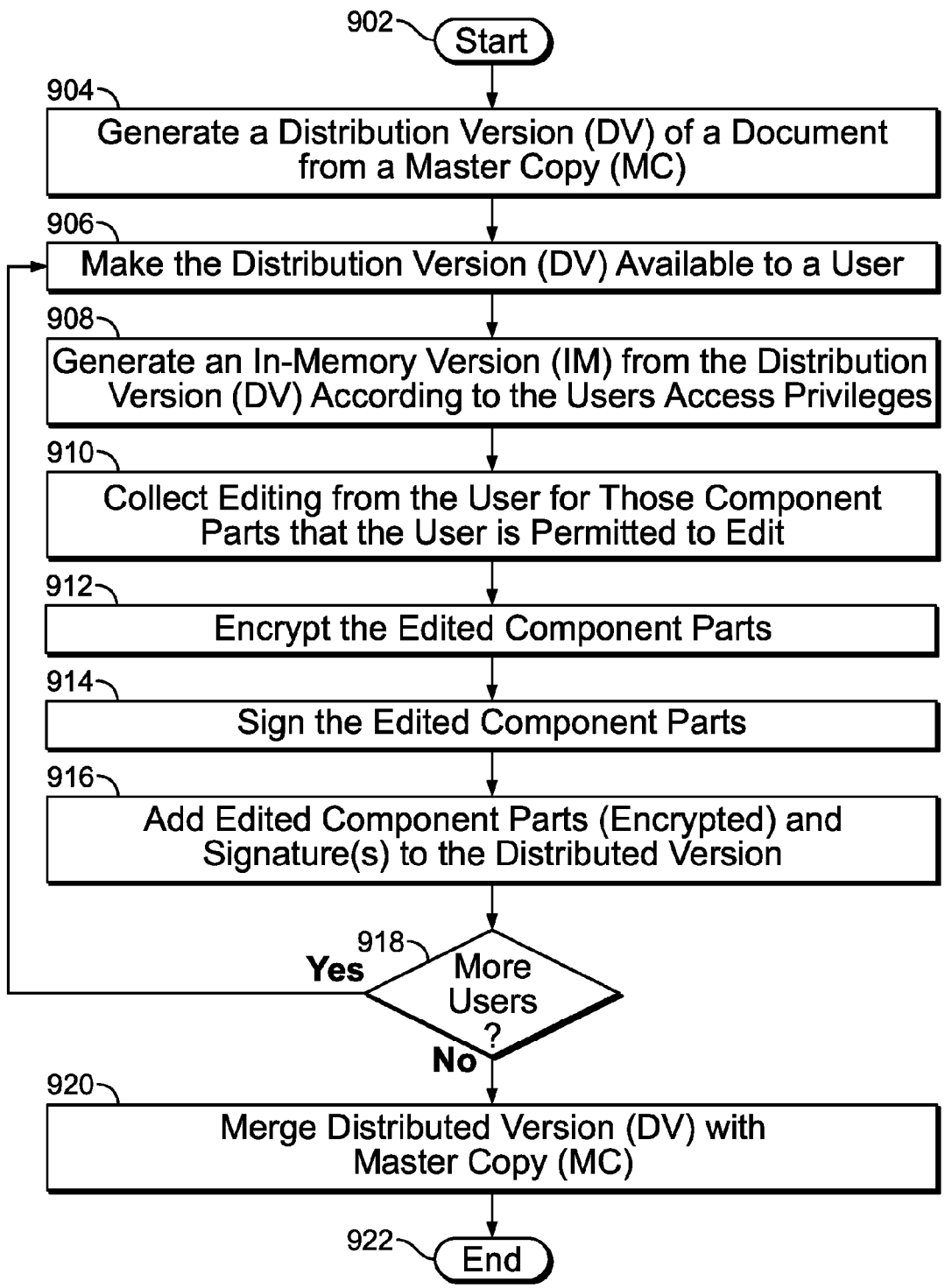
FIG. 9 is a process flow showing a process of a document life cycle where multiple users access a document, according to an embodiment of the invention.

Reference is now made to FIG. 9, which is an exemplary process flow showing a process for editing a document by multiple users, for example who may be participants in a workflow, according to an embodiment of the invention.

In step 902 a process begins and in step 904, a processor, e.g. such as processor 212, FIG. 2, may generate a distributed version (DV) of a document from a master copy (MC). A master copy may be, for example, a composite document and an MC may be maintained in a secure computer environment, such as in a firewall protected environment. A DV may have been generated automatically by an electronic workflow system to execute a set of tasks according to a workflow, where users may be workflow participants. A DV may be, for example, a *.pex document with each content part individually encrypted and signed.

In step 906, a system may make a copy of a distribution version (DV) available to a user, e.g. 206, 208, FIG. 2. In such an example, a user may have received a copy of a DV through a low security communication channel, such as through email or on a disc such as a compact disk (CD) or digital video disk (DVD). Alternatively, a processor of an electronic workflow system may, for example, allow a user to access a DV, such as by placing it on a server. A user or users may download a DV to a storage medium, such as an unsecured storage on a personal computer.

In step 908, a processor, e.g. 220, 232, FIG. 2, may be operated by a user, e.g. while running an application program, and may generate an in-memory version (IM) of a DV. An IM may be created and may exist on a transient storage, e.g. 224, 236 FIG. 2, which may be a processor RAM. IM 106 may exist while a user may be operating an application, e.g. to edit or alter a document.

Each individual user may have different access rights to content parts of a DV, and an IM may be created (and content parts that may be decrypted and shown) as each individual user accesses a DV, and may be specific to an individual user, e.g. by his or her security access rights, and also by a configuration of a computer by which a user may access an IM. An IM may have different content parts and keys for each user that may attempt to access a DV.

In step 910, a user may provide input to a document, e.g. adding, deleting and/or editing content, through IM 106, and those changes may be collected, e.g. by a processor that may operate an application program. Upon a user's completion of an editing session, (or, for example, upon a user's input of a "save" command), an application may, e.g. using a document interface, "check in" or move changes and editing back into a DV, and may create an updated version of a DV (which may remain encrypted). An application may perform periodical auto-checking for avoidance of losing data. For example, to save edits, in step 912 a processor (operating a document interface) may encrypt altered content parts. In step 914 a processor may sign encryptions. In step 916 a processor may add edited component parts to a DV. At an end of a user's session, an application may close and an IM may be erased, e.g. by a document interface, from transient storage.

In step 918, if a DV may be accessed by more users, a DV (or a copy of a DV) may be sent to another user. In one example, a DV, with the edits of a first user may be sent to a subsequent user (another workflow participant), e.g. by email or by mail (with a DV on a disk or other portable memory), and, again, a process may return to step 906. In another example, a processor, such as a processor operating an electronic workflow system, may determine if another user, e.g. another workflow participant, may need to access a DV. If so, a processor, may make a DV (now edited) available to another user (and a process returns, again, to step 906), e.g. where users may be on the same system (and a process returns to step 906). Each subsequent user (workflow participant) may follow steps 906-916 to access and further edit a DV as that user's permission may allow.

If, in step 918, there may be no further users who may need to access a DV, a processor, such as a processor at the location of the master copy (MC) may, in step 920, import a DV to a secure environment and then merge changes in a DV into an MC. In some embodiments, step 920 may be a workflow step for a DV, where a DV may be merged back into a MC. A merge step may include providing full access to a final workflow participant, and/or a document may be verified based on access keys that may be locally stored. Such a merge may occur within a secure environment, e.g. an environment in which a MC resides.

In step 920, a processor may import either a single copy of the DV (containing a user's edits and/or changes) or multiple copies of a DV (which may have been provided to users). In step 920, a processor may, for example, verify signatures on changes and upon verification, merge changes into a master copy (MC). An updated document may report back to a document master and/or be re-imported into an original environment. Such reporting and/or re-importing may be considered an additional workflow step for a DV, in some embodiments. A last workflow participant may be granted full access to a DV, as effectively completing this step. Another embodiment may include a document being verified based on locally stored access keys. Integrity of parts may be verified using last assigned signature verification keys for each part. Each part may be decrypted using a last assigned decryption key and may merge and/or update original data with new contents. Upon import, MC and DV may be both kept or merged by any predefined rules or a DV may overwrite an MC. Processing may complete in step 922. In some embodiments, a workflow may terminate without an import to an MC.

Master Structure

Figure 10:
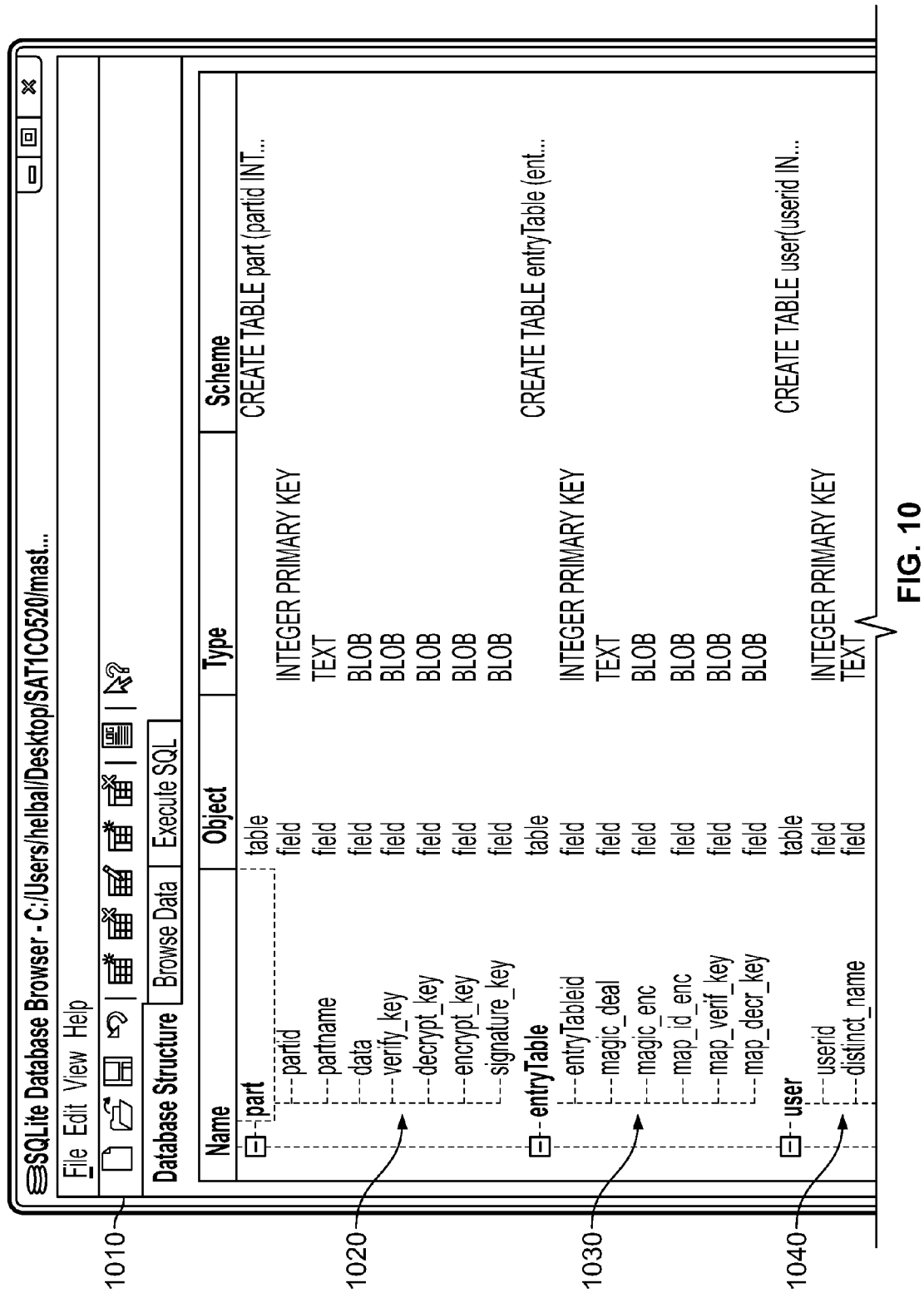
FIG. 10 is a diagram, according to an embodiment of the invention.

Reference is now made to FIG. 10, which is an exemplary diagram showing a master structure of, for example, document parts, according to an embodiment of the invention. Such a master structure may represent information that may be contained in a master copy (MC) of a composite document.

In an embodiment, FIG. 10 may represent an SQLite database browser window 1010 showing a full master .pex structure, and may include document parts, users, user roles, and granted accesses. Other information may also form a part of a master .pex structure. Parts of a document may be included by part description 1020, for example, an index or part identifier (partid), a part name (partname), data corresponding to a document part and associated verification, encryption, decryption and signature keys. Multiple part descriptions 1020 may be included corresponding to multiple documents or document parts. An entry table 1030 may have an entry table identifier (entryTableid) and include a listing of map information, for example, a map identifier (map_id_enc), a map verification key (map_verif key) and a map decryption key (map_decr_key). An entry table 1030 may also include magic word information, for example encryption (magic_enc) and clear (magic_clear) magic words. A user information listing 1040 may include information about a user, for example, a user identifier (userid), a distinct user name (distinct_name), a user role (role_title), a public key (public_key), a secret key (secret_key) and an address (address). Multiple user information listings 1040 may be included to correspond to multiple users that may form part of a workflow.

A description of roles 1050 may be included. Roles may have an identifier (roleid), a title (role_title), and/or a family to which it may belong (family). Access information 1060 may be included, and may have components of an access identifier (accessid), a corresponding role title (role_title), a corresponding document part name (part_name) and an associated value (value). Access via email may be indicated 1070, and may include an identifier (email_accessid), an associated user name (user_name), an associated document part name (part_name) and an associated value (access_value).

Window 1010 may also include other parts that form a database structure. Part indexes may be included where, for example, documents and/or document parts may be listed with associations. Similarly, user indexes and role indexes, each that may contain listings of indexed users and indexed roles, respectively, may be listed with corresponding associations.

A full master database structure, as in an example of FIG. 10, may be created by methods described by embodiments of the invention, and for example by a method of FIG. 4. Such a master structure 1010 may form a basis for an MC of a composite document. Such an MC may be used to generate a distribution version (DV) of this document.

Additional Considerations

Document serialization may be fundamental for document usability in some embodiments. Such serialization may be safely handled without a risk of losing and/or misplacing some resources, document fragments, etc. Documents may have a feature of self-inclusiveness, where all necessary resources may be included and/or available for a workflow participant with a corresponding access granted.

SQLite serialization, or other like in-memory serialization may allow faster, SQL optimized, transactional access to separate parts, in some embodiments. Each user of a composite document may simply require access to relevant fragments, and may be an improvement versus sequential extensible markup language (XML) access.

An advantage may be a reduction or removal of data repetition and/or copying across elements. An embodiment of the invention may reference corresponding table entries, and each content item may be stored only once.

Another advantage of an embodiment of the invention may be that SQL table entries may allow keeping different attributes and/or keys together with associated objects. A simplification may be realized with respect to creation and/or management of map files. An advantage over, for example XML formats, may be table entries may naturally contain binary data, that may include encrypted keys, parts, document parts, etc.

Another advantage of an embodiment may be a lack of dependency on a server-client model that may require installation and/or support, and may be cumbersome for a multitude of documents. Instead, direct local access may be possible.

An embodiment of the invention may provide a secure, coherent architecture and/or serialization mechanism for a composite document. A composite document may appear as a single entity and/or file that may be easily copied, transferred, distributed, etc., without an accidental loss of parts or fragments. A transparent mechanism may be provided for exporting out of a secure environment and/or for re-importing into a secure environment.

Unless specifically stated otherwise, as apparent from the discussion above, it is appreciated that throughout the specification discussions utilizing terms such as "processing," "computing," "calculating," "determining," or the like, refer to the action and/or processes of a computer or computing system, or similar electronic computing device, for example comprising processors, that manipulate and/or transform data represented as physical, such as electronic, quantities within the computing system's registers and/or memories into other data similarly represented as physical quantities within the computing system's memories, registers or other such information storage, transmission or display devices.

An embodiment of the invention may be implemented, for example, using a non-transitory computer readable medium or article which may store an instruction or a set of instructions that, if executed by a machine having a processor, cause the processor to perform a method and/or operations in accordance with embodiments of the invention. Such a machine having a processor may include, for example, any suitable processing platform, computing platform, computing device, processing device, computing system, processing system, computer, processor, or the like, and may be implemented using any suitable combination of hardware and/or software. The non-transitory computer-readable medium or article may include, for example, any suitable type of memory unit, memory device, memory article, memory medium, storage device, storage article, storage medium and/or storage unit, e.g., memory, removable or non-removable media, erasable or non-erasable media, writeable or re-writeable media, digital or analog media, hard disk, floppy disk, Compact Disk Read Only Memory (CD-ROM), Compact Disk Recordable (CD-R), Compact Disk Rewriteable (CD-RW), optical disk, magnetic media, various types of Digital Versatile Disks (DVDs), a tape, a cassette, or the like. The instructions may include any suitable type of code, for example, source code, target code, compiled code, interpreted code, executable code, static code, dynamic code, or the like, and may be implemented using any suitable high-level, low-level, object-oriented, visual, compiled and/or interpreted programming languages like C, C++, Java, BASIC, Pascal, Fortran, COBOL, assembly language, machine code, or the like.

The above discussion is meant to be illustrative of the principles and various embodiments of the present invention. Numerous variations and modifications will become apparent to those skilled in the art once the above disclosure is fully appreciated. It is intended that the following claims be interpreted to embrace all such variations and modifications.

We claim:

1. A method for creating a secure distribution version of a composite document comprising document parts, the method performed by a computer to perform operations comprising:
    creating a serialization having a relational database format, wherein said serialization comprises
    a content table comprising for each document part signed and encrypted versions of the document part in association with a respective document part index,
    for each user a respective signed and encrypted map file comprising in association with respective ones of the document part indices signed and encrypted signature verification and decryption keys for respective ones of the signed and encrypted versions of the document parts according to document part access information associated with the user, and
    an entry table comprising for each user a respective signed and encrypted index to the respective map file; and
    distributing the serialization to a plurality of users according to a workflow.

2. The method of claim 1, wherein each of said document parts has unique access permissions.

3. The method of claim 2, wherein said access permissions correspond to a plurality of said users.

4. The method of claim 1, wherein said encryption and said decryption keys are symmetric keys.

5. The method of claim 1, wherein said encryption and said decryption keys are asymmetric keys.

6. The method of claim 1, wherein said creating of said serialization and said content table are performed using information from a master copy of said composite document.

7. The method of claim 1, wherein said serialization is a database file.

8. The method of claim 7, wherein said database file is a .pex file.

9. The method of claim 1, wherein the creating comprises producing the content table, wherein the producing comprises encrypting confidential ones of the document parts, obtaining a respective signature for each of the encrypted and other ones of the document parts, and inserting into the content table each of the encrypted and other ones of the document parts in association with the respective signature and a respective document part index.

10. The method of claim 1, wherein the creating comprises generating the map files and the entry table, wherein the generating comprises for each user:
generating a respective user encryption key;
for each document part,
selecting a set of one or more encryption, decryption, signature, and verification keys associated with the document part according to the document part access information associated with the user,
with the respective user encryption key encrypting the selected set of keys together with the respective part identifier of the document part to obtain an encrypted map file element,
signing the encrypted map file element to obtain a respective map file element signature, and
inserting the encrypted map file element and the respective map file element signature into the respective map file;
with the respective user encryption key encrypting the respective map file together with an index to the respective map file to obtain an entry table element;
signing the entry table element to obtain a respective entry table element signature; and
inserting the encrypted entry table element and the respective entry table element signature into the entry table.

11. A system for document workflow comprising:
a memory storing processor-readable instructions;
a processor coupled to the memory, operable to execute the instructions, and based at least in part on the execution of the instructions operable to perform operations comprising
creating a serialization having a relational database format, wherein said serialization comprises
a content table comprising for each document part signed and encrypted versions of the document part in association with a respective document part index,
for each user a respective signed and encrypted map file comprising in association with respective ones of the document part indices signed and encrypted signature verification and decryption keys for respective ones of the signed and encrypted versions of the document parts according to document part access information associated with the user, and
an entry table comprising for each user a respective signed and encrypted index to the respective map file; and
distributing the serialization to a plurality of users according to a workflow.

12. The system of claim 11, wherein prior to the creating the serialization is generated from a master copy maintained in a secure location.

13. The system of claim 11, further comprising storing the serialization in the memory.

14. The system of claim 13, wherein the plurality of users perform tasks according to a workflow cycle.

15. The system of claim 11, further comprising storing the serialization in a relational database.

16. A non-transitory computer-readable medium having stored thereon instructions which when executed by a processor cause the processor to perform operations comprising:
creating a secure distribution version of a composite document comprising document parts, wherein the creating comprises creating a serialization having a relational database format, and the serialization comprises
a content table comprising for each document part signed and encrypted versions of the document part in association with a respective document part index,
for each user a respective signed and encrypted map file comprising in association with respective ones of the document part indices signed and encrypted signature verification and decryption keys for respective ones of the signed and encrypted versions of the document parts according to document part access information associated with the user, and
an entry table comprising for each user a respective signed and encrypted index to the respective map file; and
distributing the serialization to a plurality of users according to workflow.

17. The non-transitory computer-readable medium of claim 16, further comprising creating said composite document from a master copy stored in a secured environment.

\* \* \* \* \*

UNITED STATES PATENT AND TRADEMARK OFFICE
CERTIFICATE OF CORRECTION

PATENT NO. : 8,656,181 B2  
APPLICATION NO. : 13/116376  
DATED : February 18, 2014  
INVENTOR(S) : Balinsky et al.

Page 1 of 1

It is certified that error appears in the above-identified patent and that said Letters Patent is hereby corrected as shown below:

In the Claims

Column 26, line 22, Claim 14, delete "claim 13," and insert -- claim 11, --, therefor.

Signed and Sealed this  
Sixteenth Day of September, 2014

Michelle K. Lee  
*Deputy Director of the United States Patent and Trademark Office*